United States Patent
Thomas et al.

(10) Patent No.: US 7,636,061 B1
(45) Date of Patent: Dec. 22, 2009

(54) METHOD AND APPARATUS FOR LOCATION DETERMINATION OF PEOPLE OR OBJECTS

(76) Inventors: Alan Thomas, PMB 273, 136 E. 8th St., Port Angeles, WA (US) 98362; David Thomas Jewett, P.O. Box 441, Loon Lake, WA (US) 99148

( * ) Notice: Subject to any disclaimer, the term of this patent is extended or adjusted under 35 U.S.C. 154(b) by 262 days.

(21) Appl. No.: 11/341,927

(22) Filed: Jan. 28, 2006

Related U.S. Application Data

(60) Provisional application No. 60/680,865, filed on May 16, 2005, provisional application No. 60/673,025, filed on Apr. 21, 2005, provisional application No. 60/682,666, filed on May 20, 2005.

(51) Int. Cl.
*G01S 1/02* (2006.01)
*G01S 3/02* (2006.01)

(52) U.S. Cl. .................. 342/464; 342/357.06; 342/457; 342/463

(58) Field of Classification Search ............ 342/357.06, 342/442, 457, 463, 464; 455/456.1–456.3; 701/207, 213, 215
See application file for complete search history.

(56) References Cited

U.S. PATENT DOCUMENTS

| | | | |
|---|---|---|---|
| 3,774,215 A * | 11/1973 | Reed ........................... | 342/458 |
| 5,150,310 A * | 9/1992 | Greenspun et al. .......... | 342/451 |
| 5,475,393 A * | 12/1995 | Heinzerling ................. | 342/410 |
| 5,512,908 A | 4/1996 | Herrick | |
| 5,552,772 A | 9/1996 | Janky et al. | |
| 5,600,706 A | 2/1997 | Dunn et al. | |
| 5,646,632 A | 7/1997 | Khan et al. | |
| 5,815,538 A | 9/1998 | Grell et al. | |
| 5,936,572 A | 8/1999 | Loomis et al. | |
| 5,952,969 A | 9/1999 | Hagerman et al. | |
| 6,031,490 A | 2/2000 | Forssen et al. | |
| 6,040,800 A | 3/2000 | Raith et al. | |
| 6,188,354 B1 | 2/2001 | Soliman et al. | |
| 6,249,252 B1 | 6/2001 | Dupray | |
| 6,275,186 B1 | 8/2001 | Kong | |
| 6,281,834 B1 | 8/2001 | Stilp | |
| 6,285,321 B1 | 9/2001 | Stilp et al. | |
| 6,300,904 B1 | 10/2001 | Dvorak et al. | |
| 6,330,452 B1 | 12/2001 | Fattouche et al. | |
| 6,353,412 B1 | 3/2002 | Soliman | |
| 6,366,240 B1 | 4/2002 | Timothy et al. | |
| 6,438,380 B1 | 8/2002 | Bi et al. | |
| 6,453,168 B1 | 9/2002 | McCrady et al. | |
| 6,483,460 B2 | 11/2002 | Stilp et al. | |
| 6,492,944 B1 | 12/2002 | Stilp | |
| 6,493,539 B1 | 12/2002 | Falco et al. | |
| 6,510,106 B2 | 1/2003 | Hudson | |
| 6,522,296 B2 | 2/2003 | Holt | |
| 6,522,890 B2 | 2/2003 | Drane et al. | |
| 6,526,283 B1 | 2/2003 | Jang | |

(Continued)

*Primary Examiner*—Dao L Phan
(74) *Attorney, Agent, or Firm*—Morriss O'Bryant Compagni, PC

(57) ABSTRACT

A system and method for determining the position of people and/or objects, whether mobile or stationary, is presented herein. The system uses fixed and/or portable FM transmitters to transmit synchronized signals. These signals are acquired by a Receiver device which uses the signal timing to perform Time Difference of Arrival calculations to determine the Receiver's location. Then, using some arbitrary communications method, such as wireless communications, the Receiver device can forward its location to some arbitrary type of application system.

24 Claims, 28 Drawing Sheets

U.S. PATENT DOCUMENTS

| | | |
|---|---|---|
| 6,560,462 B1 | 5/2003 | Ravi et al. |
| 6,567,486 B1 | 5/2003 | Gordon et al. |
| 6,683,568 B1 | 1/2004 | James et al. |
| 6,717,547 B2 | 4/2004 | Spilker, Jr. et al. |
| 6,728,545 B1 | 4/2004 | Belcea |
| 6,741,863 B1 | 5/2004 | Chaing et al. |
| 6,748,224 B1 | 6/2004 | Chen et al. |
| 6,795,019 B2 | 9/2004 | Holt |
| 6,806,830 B2 | 10/2004 | Panasik et al. |
| 6,845,240 B2 | 1/2005 | Carlson et al. |
| 6,859,173 B2 | 2/2005 | Spilker, Jr. et al. |
| 6,891,500 B2 | 5/2005 | Hall et al. |
| 6,901,264 B2 | 5/2005 | Myr |
| 6,943,729 B2 | 9/2005 | Dobson |
| 6,958,677 B1 * | 10/2005 | Carter ........................ 340/10.1 |

* cited by examiner

METHOD AND APPARATUS FOR LOCATION DETERMINATION OF PEOPLE OR OBJECTS

CROSS-REFERENCE TO RELATED APPLICATIONS

This nonprovisional patent application claims benefit and priority under 35 U.S.C. § 119(e) of the filing of U.S. Provisional Patent Application Ser. No. 60/680,865, filed May 16, 2005, titled: "Method and apparatus for tracking and reporting the location of people or objects in a local area", U.S. Provisional Patent Application Ser. No. 60/673,025, filed, Apr. 21, 2005, titled: "Method and apparatus for relative location determination of people or objects in a local area" and U.S. Provisional Patent Application Ser. No. 60/682,666, filed, May 20, 2005, titled: "Method and apparatus for absolute location determination of people or objects in a defined area" all by the present inventors.

BACKGROUND OF THE INVENTION

1. Field of the Invention

This invention relates to location determination of one or more wireless devices.

2. Prior Art

Location determination technology—the ability to identify the location of electronic devices—has evolved toward more accurate location determination. The evolution of this technology has been driven by the need to solve several important problems, such as the location of emergency service workers (emergency rescue/fire personnel), the location of people who are in danger (such as users of E-911 cellular service), and accurate indoor location determination.

Unfortunately, large steel and concrete buildings, subways and large malls may be difficult or even impossible to cover using traditional wide area location technologies, because low signal-to-noise ratio and signal multipath effects in these environments often decrease tracking accuracy or even prevent signal acquisition.

Multiple story buildings pose additional obstacles for tracking, as they require three-dimensional positioning. Even if the longitude and latitude of an individual in a fifty-story building were known with great accuracy, that knowledge would be insufficient because the emergency team may have to search every floor. For an accuracy of 200 meters, the location fix may cover many multi-story buildings. Under these conditions, a rescue team could spend hours just searching for the caller.

Present techniques for locating electronic devices (e.g., cellular phone, PDA or computer, etc.) in both indoor and outdoor environments (such as shopping malls, urban canyons, or office buildings) require either: 1) satellite (global positioning signals "GPS") signals; or 2) GPS and assistance via cellular signals to penetrate building structures, when required; or 3) triangulation using the cellular system, or 4) some use of broadcast and/or RF signaling, or 5) some combination of these techniques.

Presently, two major approaches to GPS precision location dominate. The first, a mostly outdoor location fix technology, is the satellite vehicle-based Global Positioning System that receives a feeble code division multiple access "CDMA-like" signal from several satellites in which a receiver (using complex search routines and hardware) determines its position via the delay calculated using the received GPS signal phase, the GPS almanac and ephermis. This procedure takes several minutes in weak signal environments. The second is a system that extends the above system through use of additional information supplied via a cellular wireless network.

Snaptrack has disclosed a 'communication' system for providing GPS aiding information useful in the above second system (e.g., see U.S. Pat. Nos. 5,841,396 and 5,874,914). Communication systems require two-way signaling and information transfer. The concept is known as Assisted GPS. The SnapTrack implementation uses a communication system to send the GPS almanac, ephermis, and transfer of time from the base station to the mobile. In one mode, intermediate results are returned to the base station (and network) for further processing. With these quantities (GPS hints), the correlating receiver knows what and when to look for the appropriate satellites and can add the successive correlations of several tens of measurements, effectively pulling the feeble buried signal out of the thermal noise.

MeshNetworks has disclosed a method for location determination based upon range measurements between the portable device to be located and several fixed reference stations (see U.S. Pat. Nos. 6,768,730 and 6,728,545). This invention uses these range measurements to solve simultaneous (spherical) equations to obtain a 3-dimensional location. The accuracy of this approach is suspect, due to the fact the RF transmission is performed at (relatively) low power and is not reliable at great distances or indoor environments.

Hall, et al., has disclosed a Method and apparatus for geolocating a wireless communications device whereby the time difference of arrival for a signal received at two or more receiving sites as transmitted from a wireless communications device, is determined by a frequency domain technique. To determine the mobile location based on the determined time difference of arrival values, a seed or initial location is first assumed for the wireless communications device and the distance difference of arrival (the time difference of arrival multiplied by the speed of light) is calculated. The calculated time difference of arrival is then used to adjust the distance difference of arrival by continuously iterating the position of the wireless communications device until the calculated distance of arrival and the calculated time difference of arrival (as multiplied by the speed of light) are within a predetermined margin.

Many location determination inventions (too numerous to explicitly reference herein) have been disclosed based on Time Difference of Arrival, Time of Arrival, Enhanced-Observed Time Difference of Arrival (E-OTD), Angle of Arrival (obtaining multiple Lines-of-Bearing and solving for their intersection), and range measurements (solving for intersecting arcs or spheres). These are often combined or augmented with GPS technology. Most of these employ existing cellular infrastructure and/or other technologies which operate at frequencies too high for reliable penetration of indoor environments.

FM and other broadcast signals represent an improvement over higher frequency GPS/cellular RF signals in that they have been proven to penetrate the concrete, steal, and glass of the typical urban structure.

The Rosum Corporation has disclosed a method and apparatus for determining the position of a user terminal (e.g., see U.S. Pat. No. 6,859,173) by using a combination of broadcast signals and cellular radio signals. The method determines a first pseudo-range between the user terminal and the television signal transmitter based on a known component of the broadcast television signal; it determines a second pseudo-range between the user terminal and the mobile telephone base station based on a known component of the mobile telephone signal; and it determines a position of the user terminal based on the first and second pseudo-ranges, a location of the television signal transmitter, and a location of the mobile telephone base station; wherein the mobile telephone signal is selected from the group consisting of a EDGE (Enhanced Data Rates for Global System for Mobile Communications (GSM) Evolution) signal; a Code-Division Multiple Access 2000 (cdma2000) signal; and a Wideband Code-Division Multiple Access (WCDMA) signal.

Trimble has disclosed an invention addressing the location of emergency service workers (e.g., see U.S. Pat. No. 5,552,772) whereby they use a wide array of location determination methods, one of which is a set of unsynchronized FM subcarrier signals to perform range measurements or TDOA measurements. To obtain TDOA measurements from unsynchronized signals, the invention specifies the existence of an independent "observer module" that observes the difference in synchronization between the various reference stations and informs the receiver of the differences. The receiver then uses the synchronization difference values, combined with TDOA measurements, to derive its location.

Trimble has disclosed a portable hybrid location determination system describing an apparatus and method for determining the present location of a mobile user that carries the apparatus inside or outside buildings and structures within a region R. The apparatus includes a radio location determination (LD) signal module that receives radiowaves from at least three radio LD signal sources, such as FM carrier or subcarrier signals, and an outdoor LD signal module that receives outdoor LD signals from at least three other satellite-based or ground-based outdoor LD signal sources, such as GPS, GLONASS or Loran-C signal sources. The radio LD signals and outdoor LD signals are used to (1) determine the location of the radio LD module, (2) determine the location of the outdoor LD module and (3) determine an indicium representing signal strength or signal quality for the radio LD signals and for the outdoor LD signals. The radio LD signal indicium and the outdoor LD signal indicium are compared with threshold values for these indicia, and at most one of the radio LD module location and the outdoor LD module location is selected as the present location of the apparatus user. The radio LD module and the outdoor LD module can be combined in a hybrid portable LD system, or the two modules can be separated from and move independently of each other.

Texas Instruments has disclosed an invention addressing the location of cellular telephones (and other potential applications) by the use of broadcast signals, such as AM, FM, non-DTV, etc. (see U.S. Pat. No. 6,806,830). In this disclosure, both synchronized and unsynchronized broadcast signals are used. For unsynchronized signals, TI also uses an independent "observer module" to measure the deviation from synchronization. A drawback is that the solution may not provide sufficient geographic dispersion of the broadcast stations to obtain reliably accurate fixes. Further, this solution will not provide reliably accurate 3-d fixes because the probable location of the transmission stations does not provide the necessary angular geometry to accurately measure elevation.

There continues to exist a need in the art for a method and apparatus for location determination of people or object that addresses the problems cited above, such as poor indoor location performance, RF signal degradation, and the introduction of errors due to weak signal or multipath. Specifically, it would be desirable to have an method and apparatus that performs reliable and accurate 3-dimensional location determination for both indoor and outdoor locations. Such a method and apparatus may be used in cellular telephone networks (in support of E-911 or other location-based services), by emergency first responders (fire, rescue, police, swat, etc.), or for any other location determination application.

SUMMARY OF THE INVENTION

Presented herein is a location determination apparatus, method and system that is an improvement upon existing location determining techniques. The invention enables precision indoor and outdoor location determination through the use of synchronized FM or other terrestrial RF signals (e.g. one way, wide area) transmitted from multiple transmitter stations and received by a receiving device which uses the synchronized signals to measure the time difference of arrival between each pair of transmitters, formulates a hyperbolic equation for each pair of signals, and simultaneously solves the equations to determine the 2-dimensional and/or 3-dimensional location of the receiving device.

Each transmitter node transmits a synchronized pulse that includes information about the transmitter—such as position of the node, and a designation as a Master or Slave of a set of transmitter nodes. The time interval between each transmitted pulse is the same amongst all transmitter nodes.

This invention provides for synchronization of the transmitter node signals using a variety of methods. Two examples are: 1) attached to each transmitter node is a precision GPS timing device that enables synchronization with all other transmitter nodes based on GPS time; and/or; 2) there is designated a "master" transmitter node that sends synchronization information to the (slave) transmitter nodes.

The invention also provides reliable, accurate location determination when the transmissions from each of the transmitter nodes are out of phase (un-synchronized). In addition, the invention facilitates the portability of transmitter nodes, which may enhance the angular geometry of the transmissions relative to the receiving device, resulting in enhanced 3-D location determination in virtually any rural, suburban, or urban region.

The invention provides the capability to position transmitter nodes virtually anywhere, thus enhancing angular geometry and location accuracy.

DETAILED DESCRIPTION

Figure 3:
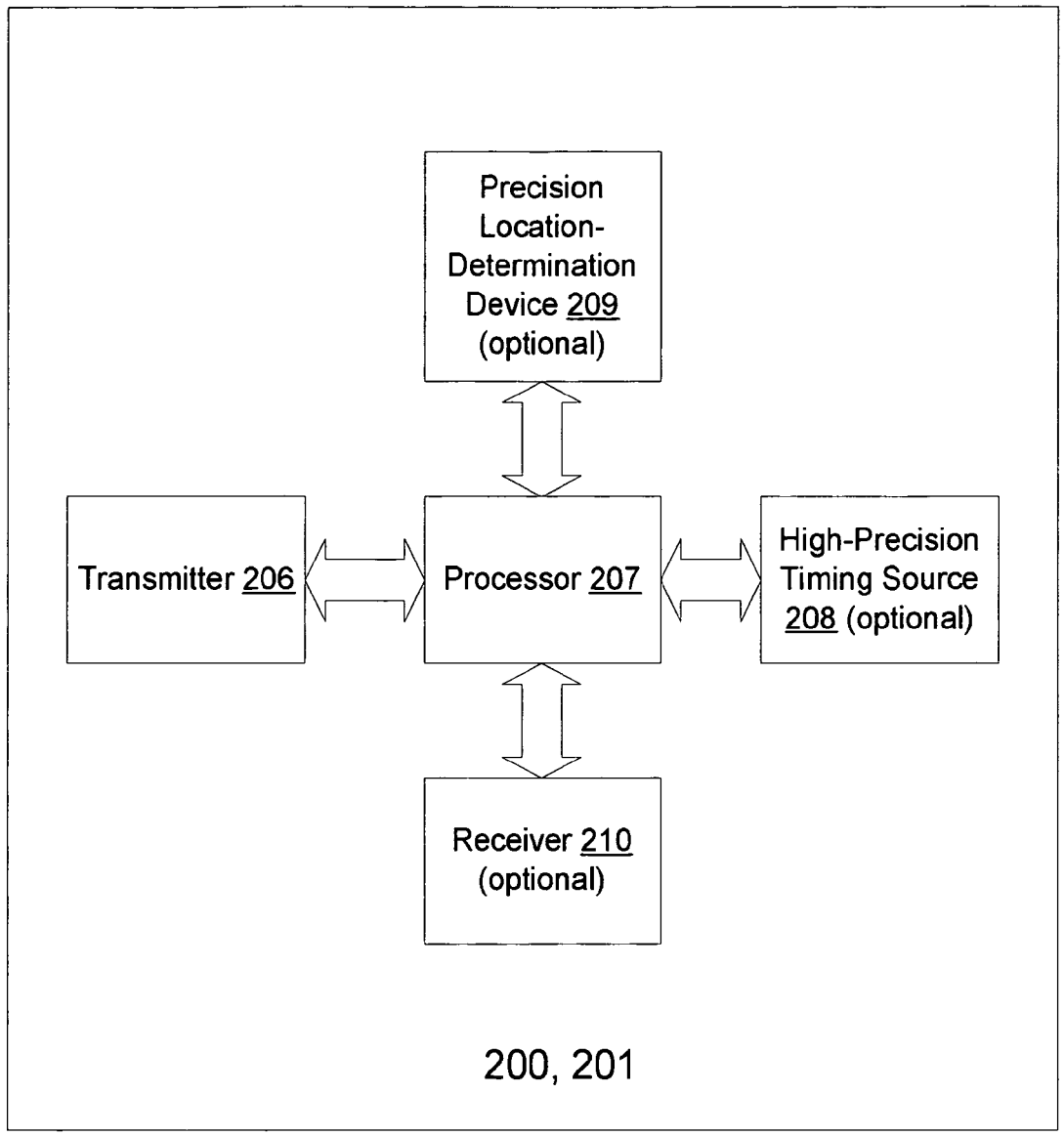
FIG. 3 illustrates a block diagram of the BT node—the illustration includes all optional components.

This present invention may utilize three or more geographically-dispersed transmitter nodes (hereinafter called a "BT node"). Each BT node may consist of an FM transmitter, a high-precision timing source (optional), high-precision location determination device (optional), FM receiver (optional), and computer processor, according to embodiments of the present invention. See FIG. 3 for a block diagram of an embodiment of a BT node.

The present invention may also include one or more Receiver nodes (hereinafter called "RC" node). Each RC node monitors 3 or more BT channels—the RC node may choose channels according to any specific criteria. Two possible examples of BT selection are: (1) monitoring those channels that exhibit the "strongest" signal, or (2) acquiring signals based upon the locations of their source BT nodes.

Figure 1:
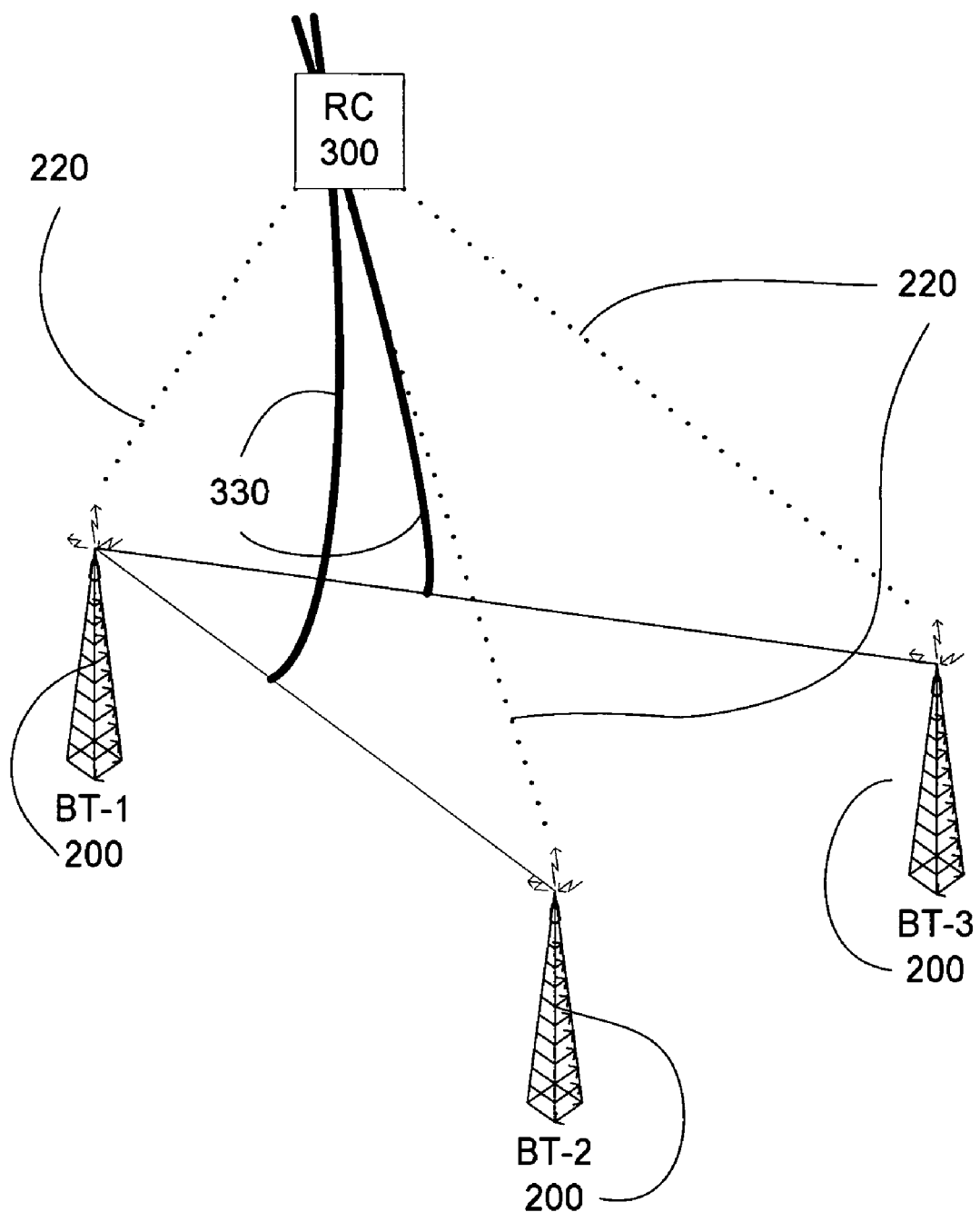
FIG. 1 illustrates time difference of arrival plots using transmissions from three transmitter nodes to obtain location information on a single receiver node.
Figure 2:
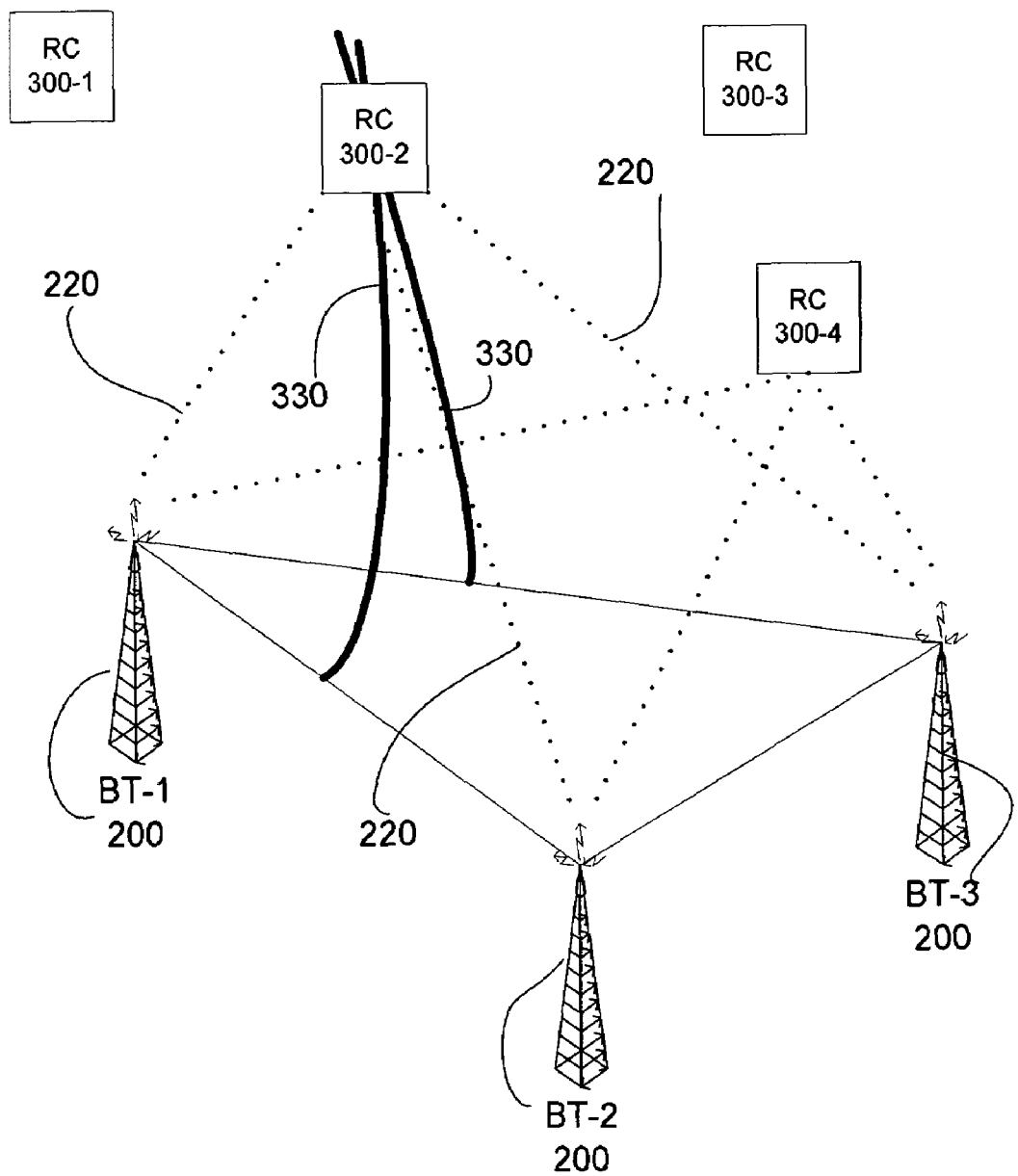
FIG. 2 illustrates time difference of arrival plots using transmissions from three transmitter nodes to obtain location information on multiple receiver nodes.
Figure 4:
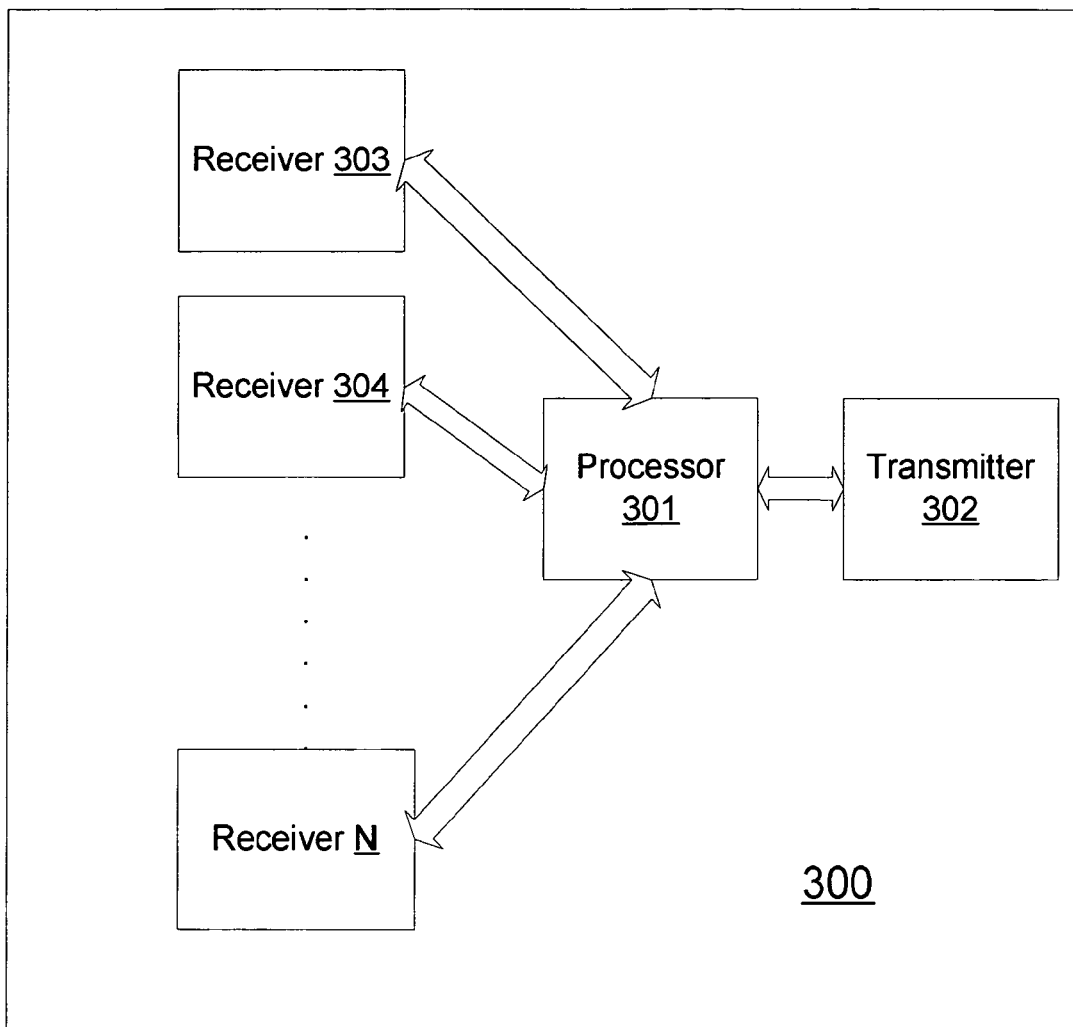
FIG. 4 illustrates a block diagram describing the primary components of a receiver (RC) node.

Each RC node (see FIG. 4 for a block diagram of an embodiment of an RC node) calculates the Time Difference of Arrival (TDOA) between each pair of BT signals, uses the TDOA values to generate hyperbolic equations, solves for the intersection of these equations, and combines the calculated result with the known position of the BT nodes to determine its own location. Optionally, each RC node may transmit the TDOA values and BT node location information to a Location Processor (hereinafter called an "LP Node"); whereby the LP Node would then perform appropriate calculations to determine the RC node's location. FIGS. 1 and 2 illustrate TDOA plots, with FIG. 1 describing a single RC node TDOA plot and FIG. 2 depicting an environment with multiple RC nodes. Depending on the number of BT Nodes and the angular geometry that is derived by the locations of each of the BT Nodes relative to the target RC node, the present invention can support 3-dimensional location determination.

To support RC location determination, each BT node may possess the following characteristics/capabilities: (1) each BT node is assigned a unique BT Node Identifier, (2) each BT node will be provisioned with a high-precision position fix of its own location or, it will acquire its location using an attached high-precision GPS device, or it will acquire its location using some other high-precision location technology. (3) Each BT node will (optionally) synchronize its timing to the timing acquired by its high-precision timing device; thus synchronizing its timing with all other BT nodes using the same timing source. (4) Each Slave BT node may optionally synchronize itself to a Master BT node, using the timing and location information transmitted from the Master BT node, and combining it with its own location information. (5) The time interval between each transmitted pulse is the same amongst all BT nodes.

According to other embodiments of the present invention, each BT-node may emit an Identity Pulse Signal at N times per minute (where N is some predetermined integer that is consistent across all BTs). This signal is comprised of the BT's Pulse, its specific identity (BT Node Identifier), and the BT node's location.

An important characteristic of the present invention is the ability to penetrate diverse building structures where other forms of RF technology either fail, or are significantly less successful. Penetrability is enabled by two primary factors: (1) the range of frequencies normally occupied by commercial and municipal FM transmissions tend to support penetration of buildings and structures; and (2) FM technology—that is, Frequency Modulation—is better suited to penetration of buildings than most alternative FM technologies. Thus, the range of frequencies and the choice of FM technology each play a role in the selection of "appropriate" frequencies.

Using frequencies in the commercial or municipal range, or some other "appropriate" range of frequencies, each BT Transmitter transmits a pulse on a distinct channel whereby channels are assigned so that there is no conflict with any other BT node within the BT node's transmission range.

SYNCHRONIZATION—Any one of several methods may be used to synchronize BT Nodes. For example and not by way of limitation: (1) by using GPS as a timing source, each BT pulse is synchronized to the pulse emitted by the other transmitters, to within +/−"x", where x is some number of nanoseconds; (2) a Master BT Node may send specific synchronization information directly to each Slave BT Node; or (3) each Slave BT Node may receive the transmission of the Master BT Node and adjust its own transmission timing to synchronize with the Master—this can be performed because each BT Node knows the distance between itself and the Master and can include this distance into its calculations to determine correct synchronization.

RELATIVE LOCATION DETERMINATION—In circumstances where BT Nodes are not synchronized, location determination may still be performed. This is because, for all RC Nodes whose locations are determined by the same (unsynchronized) BT Node transmissions, the "relative" position amongst the RC Nodes remains accurate—even though the measured positions of the RC Nodes may be incorrect. Thus, to obtain the actual locations of these RC Nodes, one need only calculate both the "actual" and the "relative" positions of one RC (or RC-like) Node, determine the difference between the actual and relative locations, and map (or "shift") all of the RC Nodes' relative locations to their "actual" locations.

Specifically, assuming that the BT Node transmissions are not synchronized, the actual location of each RC Node can be determined by the following method, or some variant thereof:

(1) the RC node detects and receives FM signals from at least three BT Nodes,
(2) the RC node determines relative TDOA data for the received BT Node FM signals,
(3) the RC node obtains the RC Node's own relative location, by solving simultaneous hyperbolic equations based on the TDOA data, and
(4) the RC node sends the relative location, TDOA data, and the BT Node ID of each BT Node used in the calculation to a "Location Processor" Node.
(5) Using the same BT Nodes as were used by the RC Node(s), the Location Processor may determine its own "relative" location according to steps (1), (2), and (3) above. Then, the Location Processor may determine its own "actual" location (by accessing some form of independent location technology, such as D-GPS), and then calculate the "difference" between its own relative and actual locations.
(6) The Location Processor then uses the "difference" to map the RC Node's relative location to the RC Node's actual location.

TRANSMITTER NODE LOCATION—A BT node can be placed at either a fixed location, or it can be transported as a portable unit and set up ad hoc. The advantages of a portable BT node are: (1) to provide extra BT nodes in areas where the number of fixed-site BT nodes is too small for adequate location determination performance and (2) to enhance angular geometry so that 2-dimensional and 3-dimensional location fixes are more accurate.

APPLICATIONS—One of skill in the art will readily recognize that embodiments of the present invention may be used in a variety of applications. Although not limited to the following, two such applications are cellular telephone network location determination (such as Enhanced-911) or an emergency first-responder services scenario.

Figure 5:
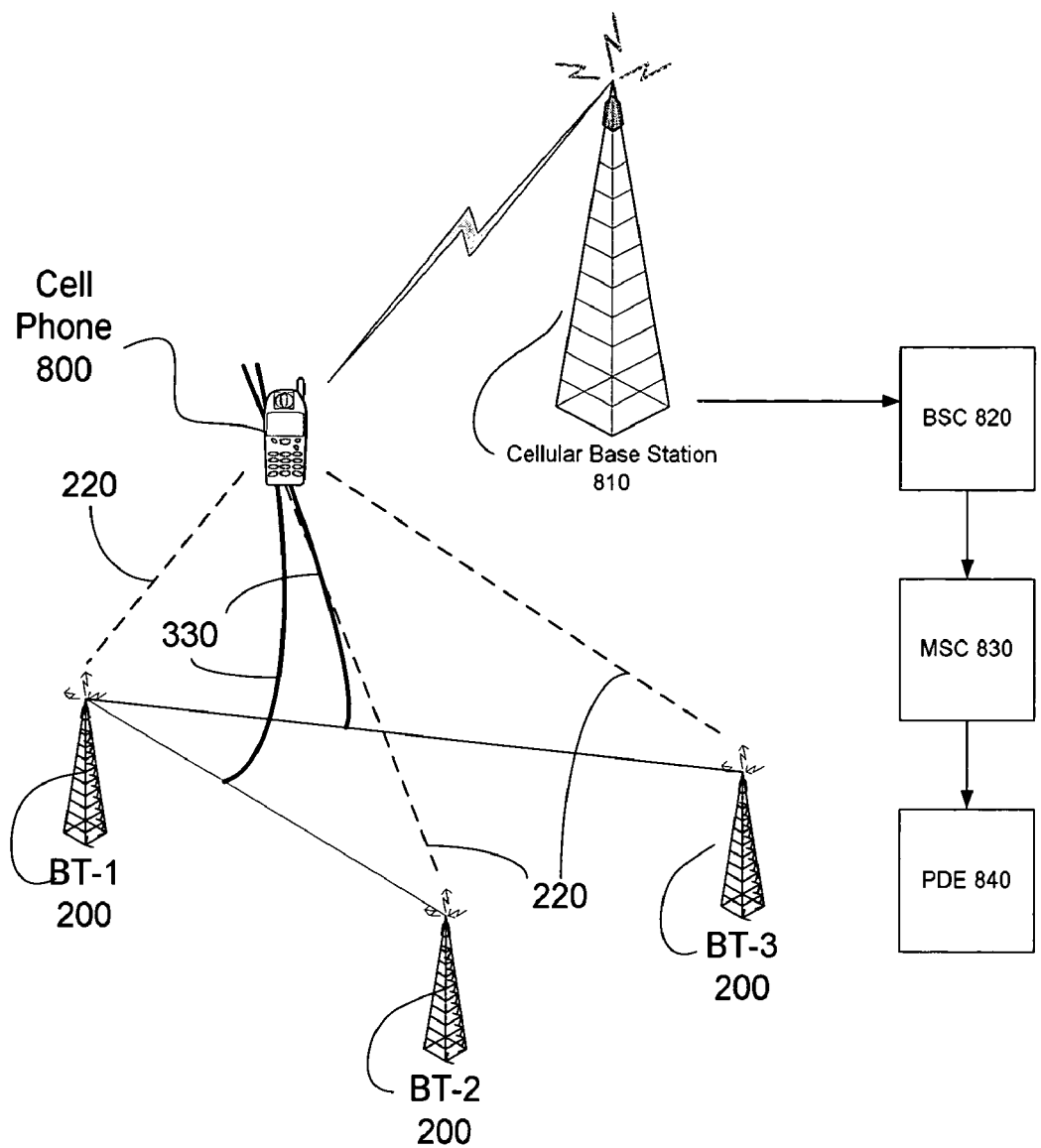
FIG. 5 illustrates an example of this invention in a cellular network.

FIG. 5 illustrates an implementation of this invention into a CDMA/IS41 cellular telephone network. In this illustration, each of 3 BT Nodes 200 transmit an FM synchronization signal which is received by the cellular handset 800. Because the cellular handset 800 contains an implementation of the RC Node location technology, the cellular handset 800 determines its location and transmits its location into the cellular network via the Cellular Base Station 810.

Figure 6:
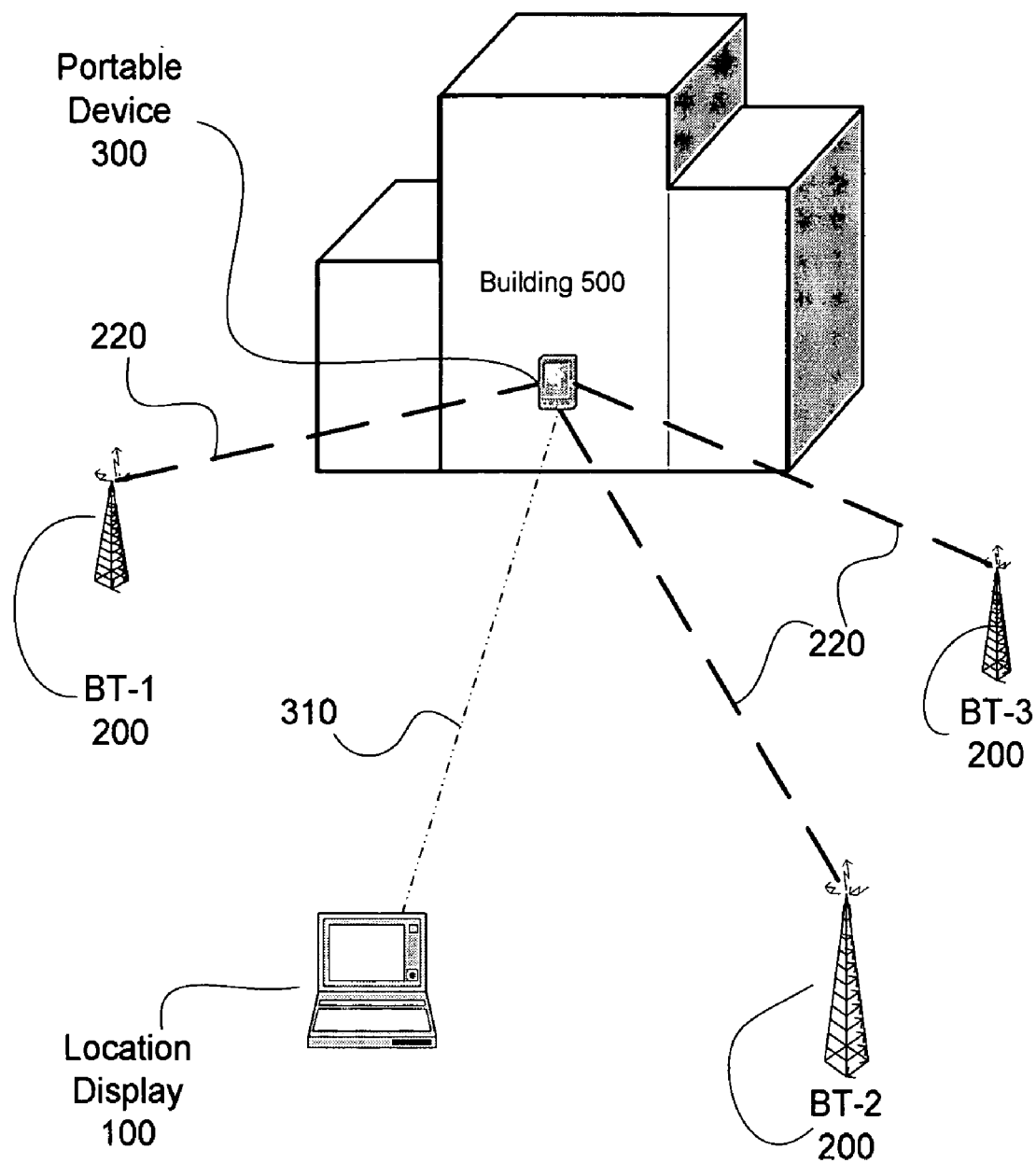
FIG. 6 illustrates an example of this invention in an emergency first-responder scenario.

FIG. 6 illustrates an implementation of this invention as a location system for emergency first-responder applications. In this illustration, each of 3 BT Nodes 200 transmits an FM synchronization signal which is received by the Portable Device 300. Because the Portable Device 300 contains an implementation of the RC Node location technology, the portable device 300 determines its location and transmits its location to a location display CPU 100 which in turn displays a map of the location of each portable device 300. Presumably, each emergency first-responder is carrying a portable device 300.

Figure 7:
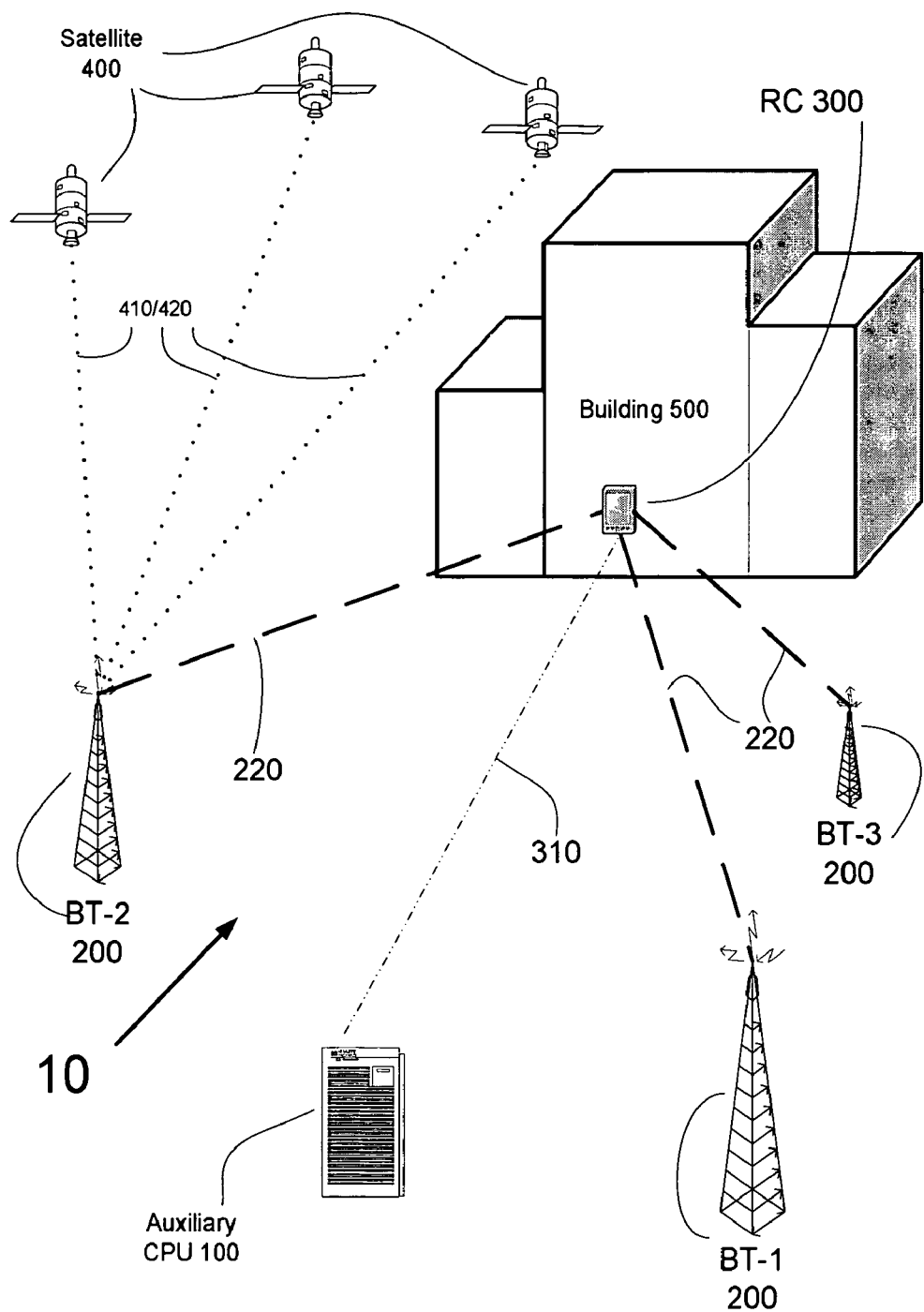
FIG. 7 illustrates a system 10, which is a preferred embodiment of the invention.

FIG. 7 illustrates a presently preferred embodiment of the present invention. In this embodiment, a system 10 utilizes some form of FM (Frequency Modulation) transmission 220 from BT Nodes 200 (illustrated further in FIG. 17), having their transmissions 220 locked (that is, synchronized) to a common time, such as GPS time or some other arbitrary time 410 and 208 and contains information describing the location of each BT Node 200. An RC node 300 in Building 500 detects and receives the FM transmissions 220 from 3 or more BT Nodes 200. The BT Node transmissions 220 contain information that describes the location of the BT Node, the location being derived from a high-precision location determination device (such as Differential-GPS) 420 and 209.

Utilizing a common locked time amongst the transmitted signals 220, the RC node 300 determines the Time Difference of Arrival (TDOA) of the received signals and combines this information with the location information of each BT Node 200, and thereafter formulates and solves simultaneous hyperbolic equations to obtain the RC node's 300 location. After the RC node 300 determines its location, it may transmit the location information 310 to an Auxiliary CPU 100, whereby the auxiliary CPU performs some form of application processing.

Figure 17:
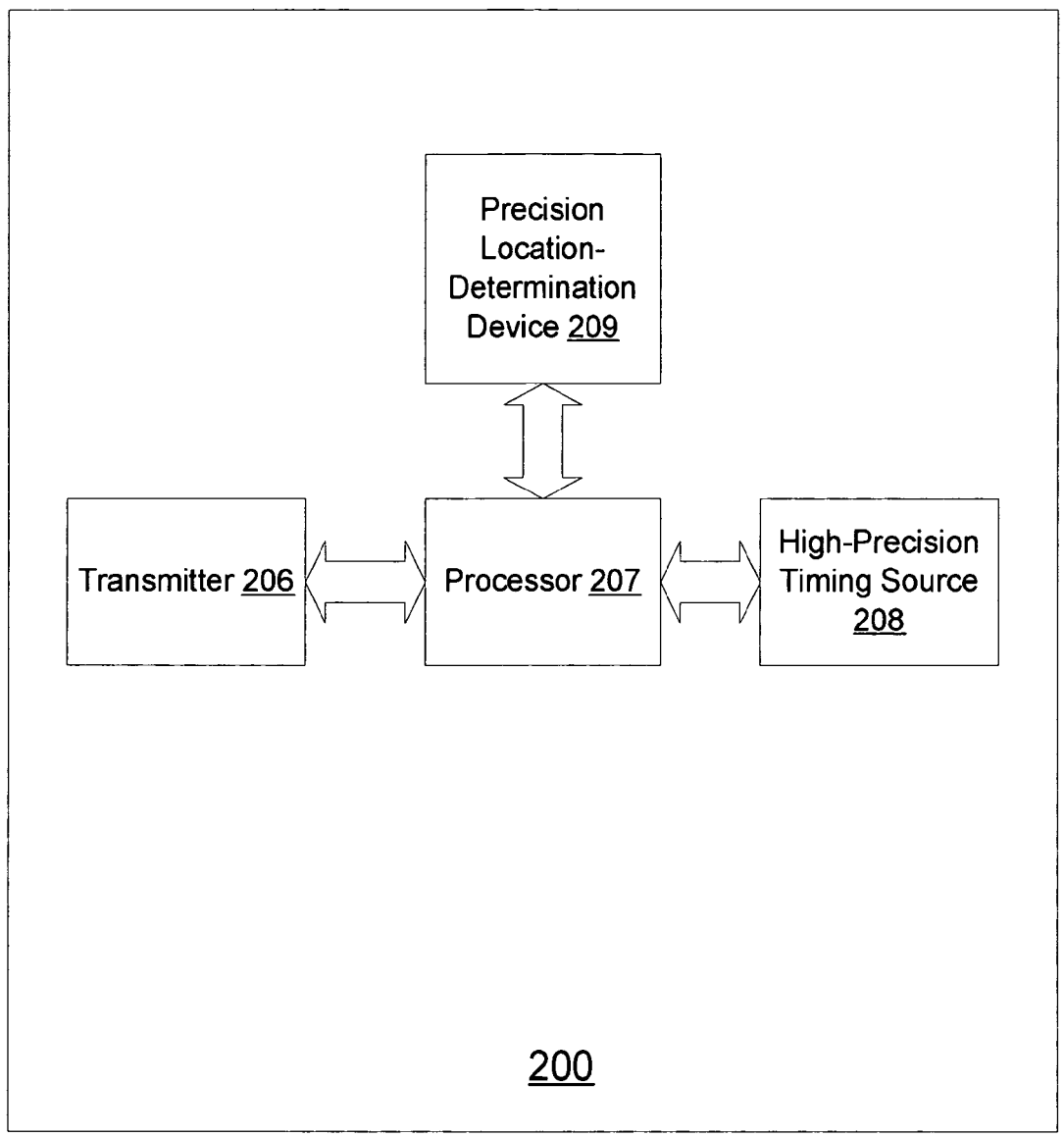
FIG. 17 illustrates a block diagram of an alternative embodiment of the BT node with a transmitter 206, processor 207, Precision Location-Determination Device 209, and High-Precision Timing Source 208.

FIG. 17 illustrates a block diagram of the BT Node that is utilized for this embodiment. In FIG. 17, the BT Node 200 obtains precise location information about itself via a Precision Location-Determination Device 209 (such as a Differential-GPS or some other high-precision location system) and provides this location information to the Processor 207. BT Node 200—specifically a High-Precision Timing Source 208 device—may obtain precise timing information from some form of external high-precision timing source (such as GPS time, or some other arbitrary external time source) and provide the timing information to the Processor 207. As depicted in FIG. 17, the Processor 207 uses the timing information and the BT Node's location information to build and maintain the timing and contents of the BT Node's transmission 220.

The capability to generate an accurate 3-Dimensional location fix depends, in part, on the angular geometry of the BT Nodes 200 in relation to the location of the target RC Node 300 (that is, the RC node to be located). In this embodiment, the High-Precision Location Device 209 embedded in each BT Node allows the BT Node(s) 200 to be portable, because the High-Precision Location Device 209 continually updates the current location of its BT Node 200. This means that one or more BT Nodes 200 may be transported to locations that enhance angular geometry, resulting in more precise location fixes to the target RC Node 300.

Figure 8:
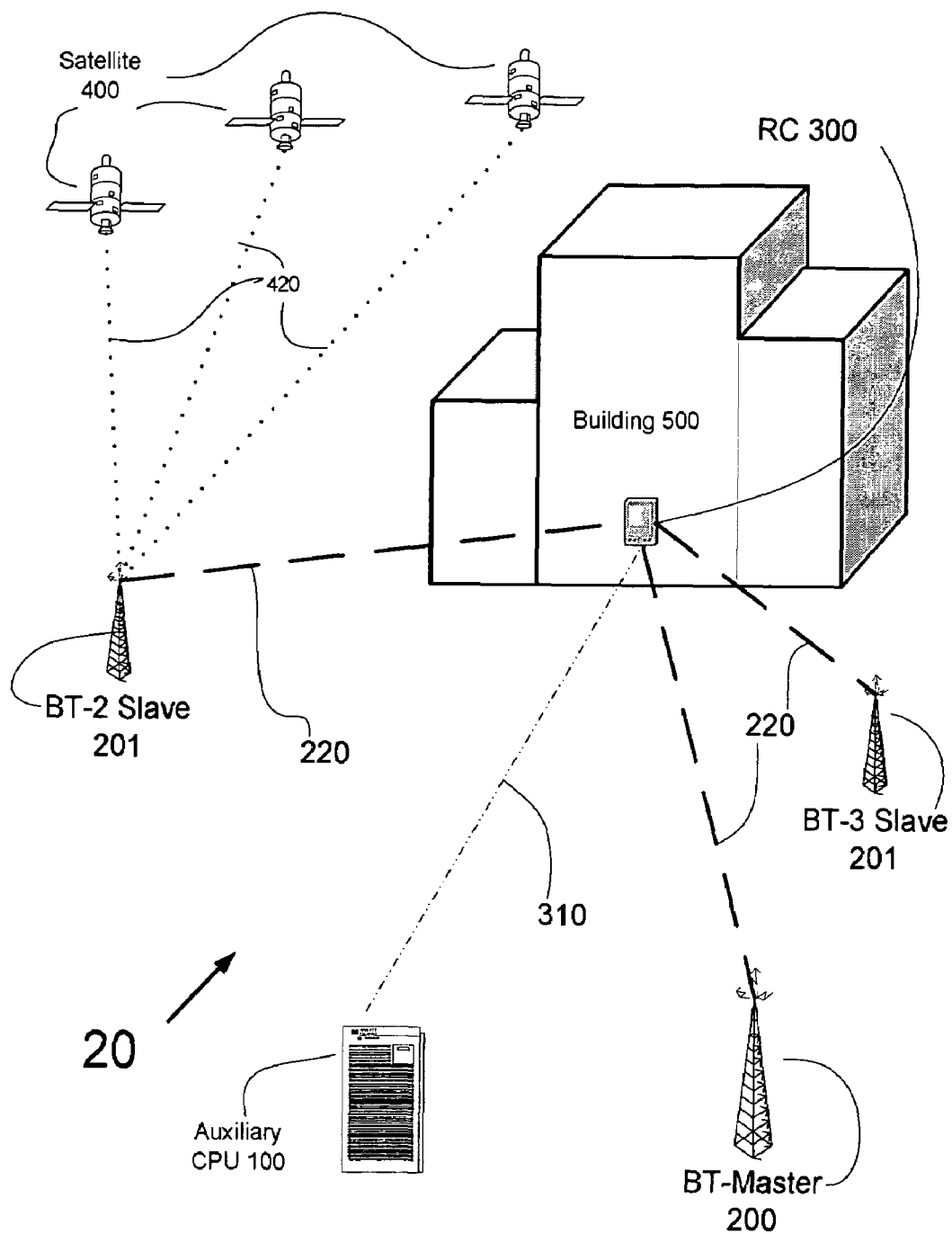
FIG. 8 illustrates a system 20, which is another embodiment of the invention.

In another embodiment of the present invention, FIG. 8 illustrates a system 20 that utilizes some form of FM (Frequency Modulation) transmission 220 from BT Nodes 200, 201 (illustrated further in FIG. 18), having their transmissions 220 locked (that is, synchronized) to a common time clock, such as a GPS time clock or some other arbitrary time clock and contains information describing the location of each BT Node 200, 201. An RC node 300 in Building 500 detects and receives the FM transmissions 220 from 3 or more BT Nodes 200, 201. The BT Node transmissions 220 contain information that describes the location of the BT Node, the location being derived from a high-precision location determination device (such as Differential-GPS) 420 and 209)

Utilizing a common locked time amongst the transmitted signals 220, the RC node 300 determines the Time Difference of Arrival (TDOA) of the received signals and combines this information with the location information of each BT Node 200, 201, and thereafter formulates and solves simultaneous hyperbolic equations to obtain the RC node's 300 location. After the RC node 300 determines its location, it may transmit the location information 310 to an Auxiliary CPU 100, whereby the auxiliary CPU performs some form of application processing.

Figure 18:
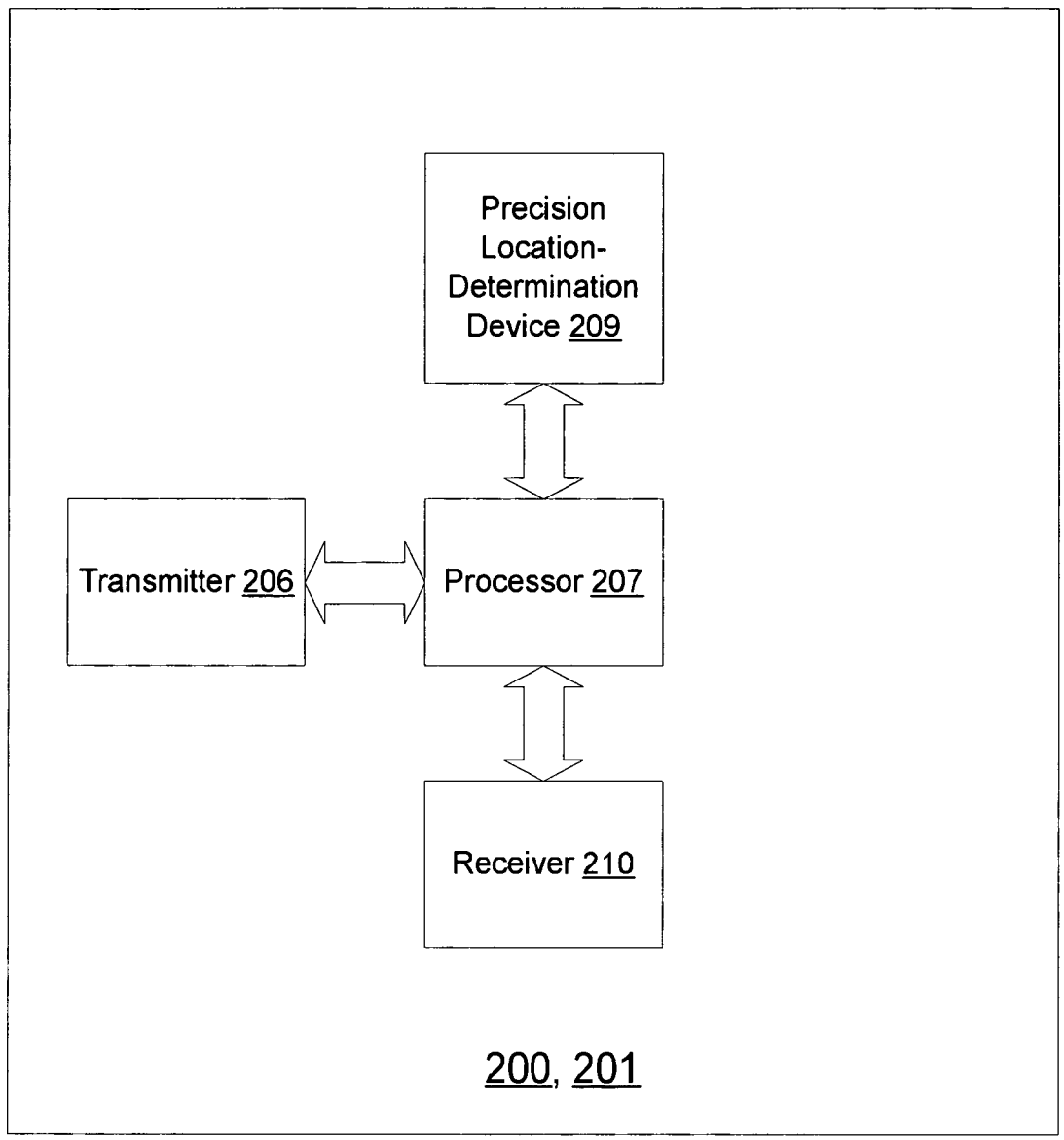
FIG. 18 illustrates a block diagram of an alternative embodiment of the BT node with a transmitter 206, processor 207, Precision Location-Determination Device 209, and Receiver 210.

FIG. 18 illustrates a block diagram of the BT Node that is utilized for this embodiment of the present invention. In this illustration, the BT Node 200, 201 obtains precise location information about itself via a Precision Location-Determination Device 209 such as a Differential-GPS or some other high-precision location system and provides this location information to the Processor 207.

Also in FIGS. 8 and 18, each of the BT Node Slaves 201 obtains precise timing information from its BT Node Master 200 using the Receiver 210, locks its timing to that of the BT Node Master 200, and provides the timing information to the Processor 207. Each BT Node Slave 201 uses the transmission of the BT Node Master, combined with its own location to determine its synchronization with the BT Node Master 200. As depicted in FIG. 18, the Processor 207 uses the timing information and the BT Node's location information to build and maintain the timing and contents of the BT Node's transmission 220.

The capability to generate an accurate 3-Dimensional location fix depends, in part, on the angular geometry of the BT Nodes 200, 201 in relation to the location of the "object" RC Node 300 (that is, the RC node to be located). In this embodiment, the High-Precision Location Device 209 embedded in each BT Node allows the BT Node(s) 200 to be portable, because the High-Precision Location Device 209 continually updates the current location of its BT Node 200, 201. This means that one or more BT Nodes 200 may be transported to locations that enhance angular geometry, resulting in more precise location fixes to the object RC Node 300.

Figure 9:
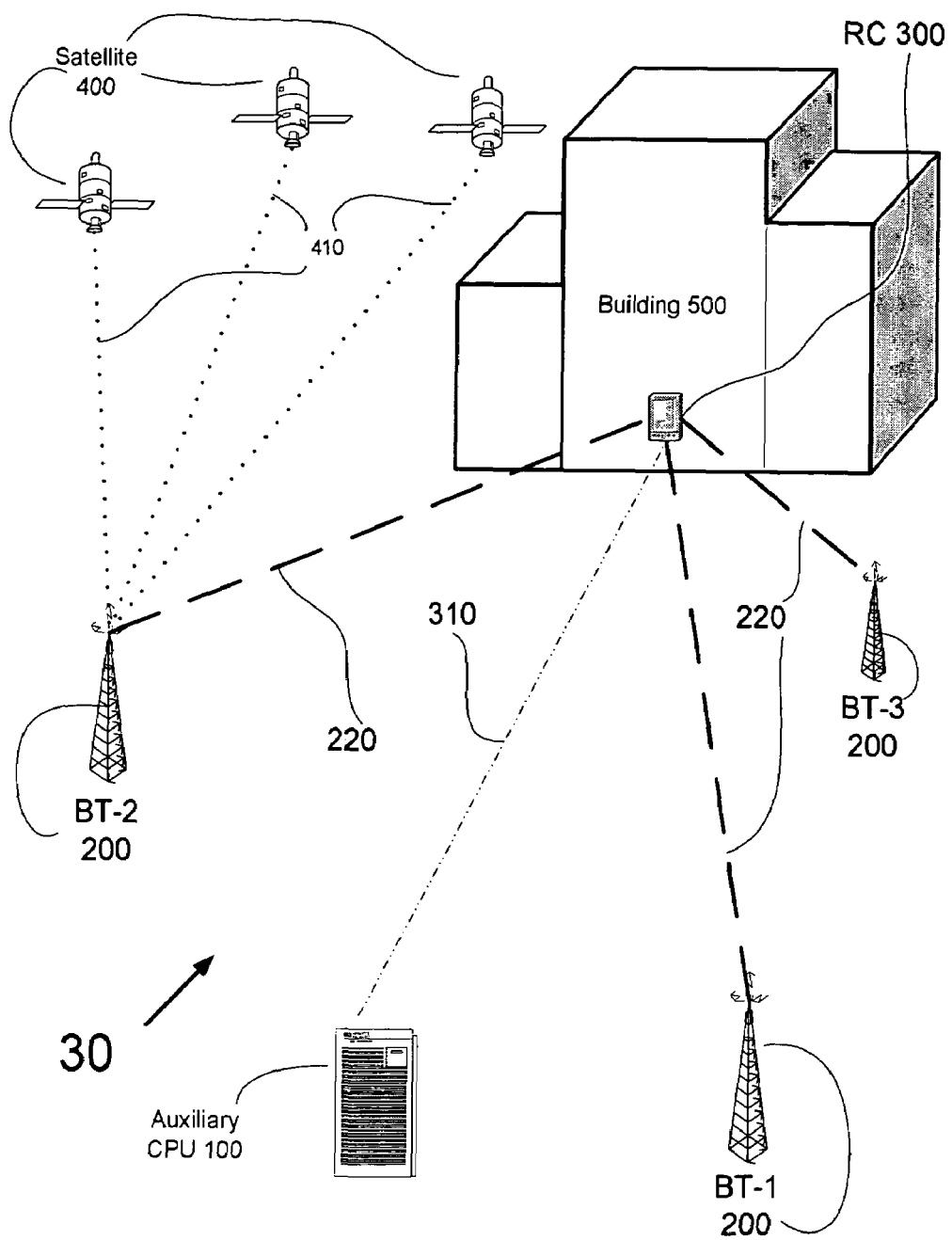
FIG. 9 illustrates a system 30, which is another embodiment of the invention.

In still another embodiment of the present invention, FIG. 9 illustrates a system 30 that utilizes some form of FM (Frequency Modulation) transmission 220 from BT Nodes 200 (illustrated further in FIG. 19), having their transmissions 220 locked (that is, synchronized) to a common time clock, such as a GPS time clock or some other arbitrary time clock 410 and contains information describing the location of each BT Node 200. An RC node 300 in Building 500 detects and receives the FM transmissions 220 from 3 or more BT Nodes 200. The BT Node transmissions 220 contain information that describes the location of the BT Node, which is previously provisioned into the BT Node 200.

Utilizing a common locked time amongst the transmitted signals 220, the RC node 300 determines the Time Difference of Arrival (TDOA) of the received signals and combines this information with the location information of each BT Node 200, and thereafter formulates and solves simultaneous hyperbolic equations to obtain the RC node's 300 location. After the RC node 300 determines its location, it may transmit the location information 310 to an Auxiliary CPU 100, whereby the auxiliary CPU performs some form of application processing.

Figure 19:
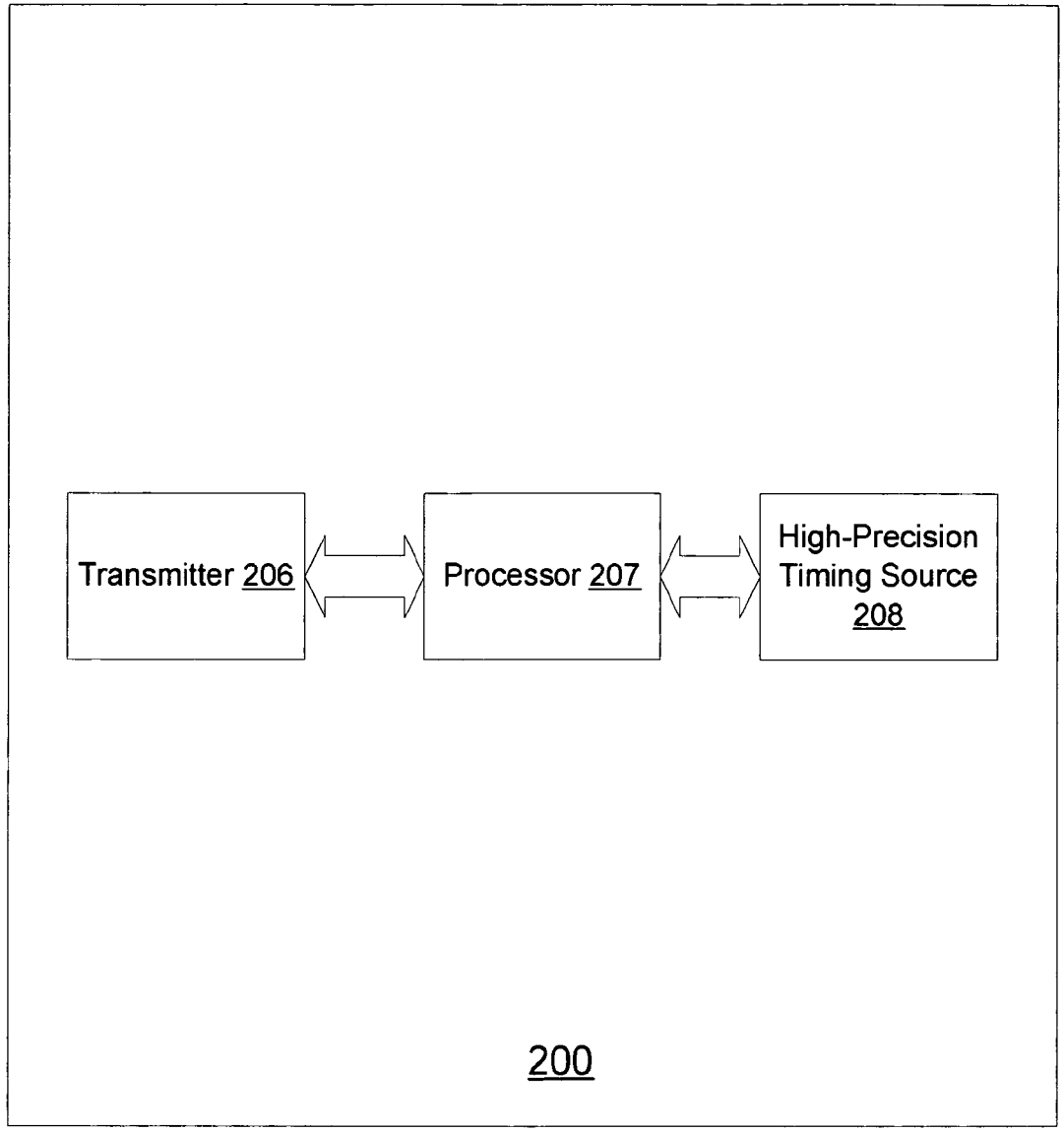
FIG. 19 illustrates a block diagram of an alternative embodiment of the BT node 200 with a transmitter 206, processor 207, and High-Precision Timing Source 208.

FIG. 19 illustrates a block diagram of the BT Node that is utilized for this embodiment of the present invention. In this illustration, the BT Node 200 obtains precise location information about itself as a result of manual or automated provisioning of the BT Node 200. Also in FIG. 19, the BT Node 200—specifically a High-Precision Timing Source 208 device—obtains precise timing information from some form of external high-precision timing source (such as GPS time, or some other arbitrary external time source) and provides the timing information to the Processor 207. As depicted in FIG. 19, the Processor 207 uses the timing information and the BT Node's location information to build and maintain the timing and contents of the BT Node's transmission 220.

Figure 10:
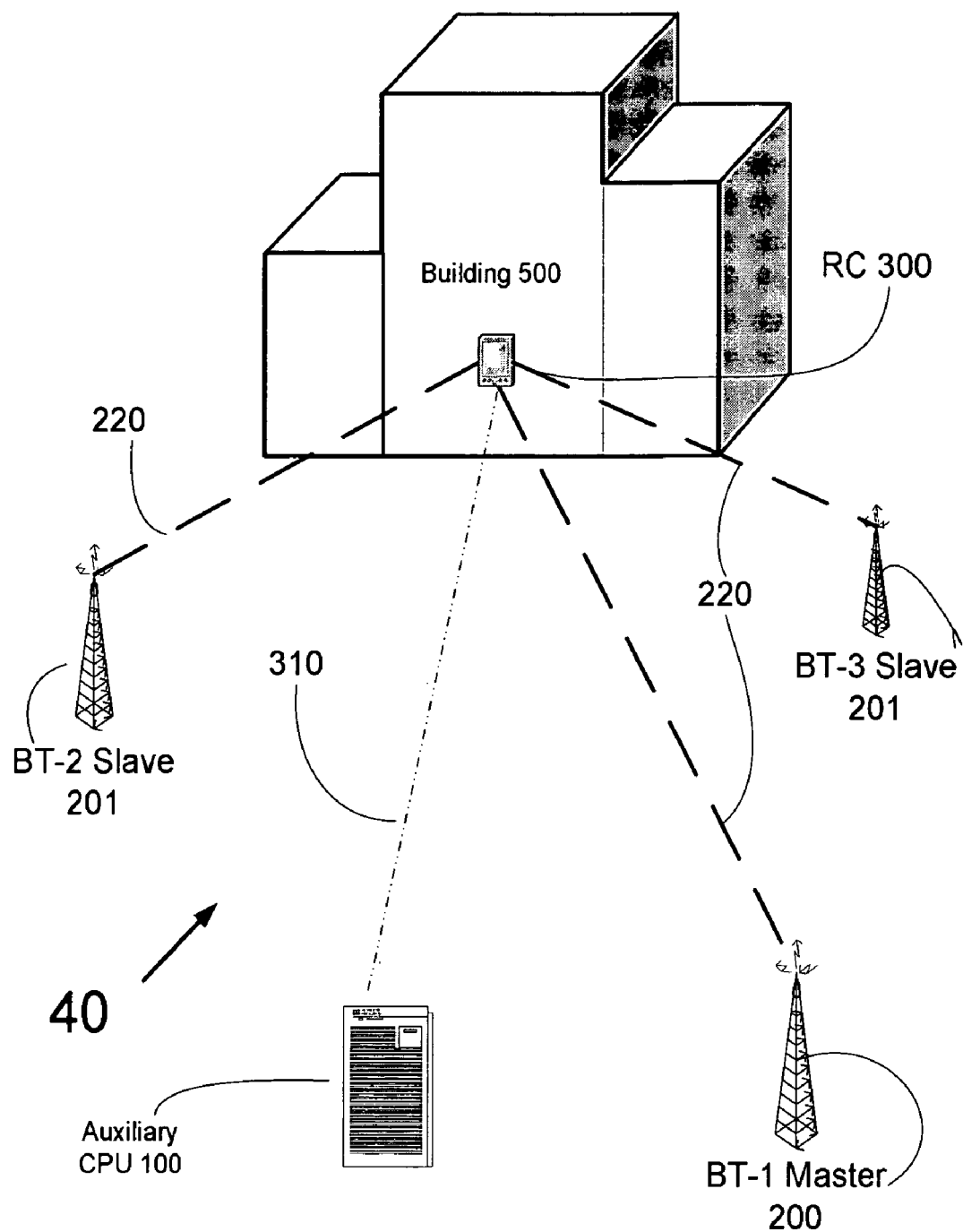
FIG. 10 illustrates a system 40, which is another embodiment of the invention.

In still another embodiment of the present invention, FIG. 10 illustrates a system 40 that utilizes some form of FM (Frequency Modulation) transmission 220 from BT Nodes 200, 201 (illustrated further in FIG. 20), having their transmissions 220 locked (that is, synchronized) to a common arbitrary time clock and contains information describing the location of each BT Node 200, 201. An RC node 300 in Building 500 detects and receives the FM transmissions 220 from 3 or more BT Nodes 200. The BT Node transmissions 220 contain information that describes the location of the BT Node, which is previously provisioned into the BT Node 200, 201.

Utilizing a common locked time amongst the transmitted signals 220, the RC node 300 determines the Time Difference of Arrival (TDOA) of the received signals and combines this information with the location information of each BT Node 200, 201, and thereafter formulates and solves simultaneous hyperbolic equations to obtain the RC node's 300 location. After the RC node 300 determines its location, it may transmit the location information 310 to an Auxiliary CPU 100, whereby the auxiliary CPU performs some form of application processing.

Figure 20:
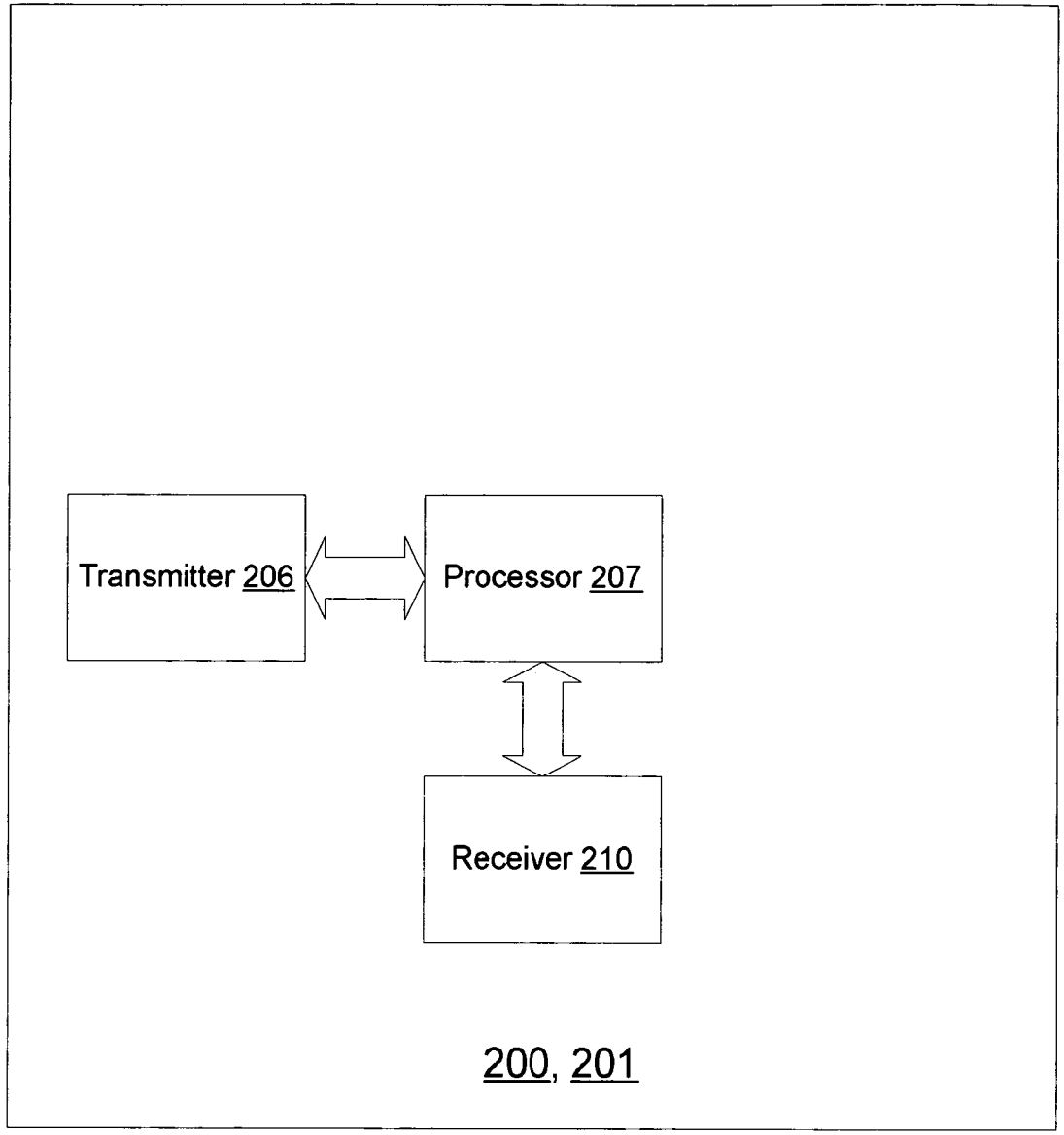
FIG. 20 illustrates a block diagram of an alternative embodiment of the BT node 200 with a transmitter 206, processor 207, and Receiver 210.
Figure 21:
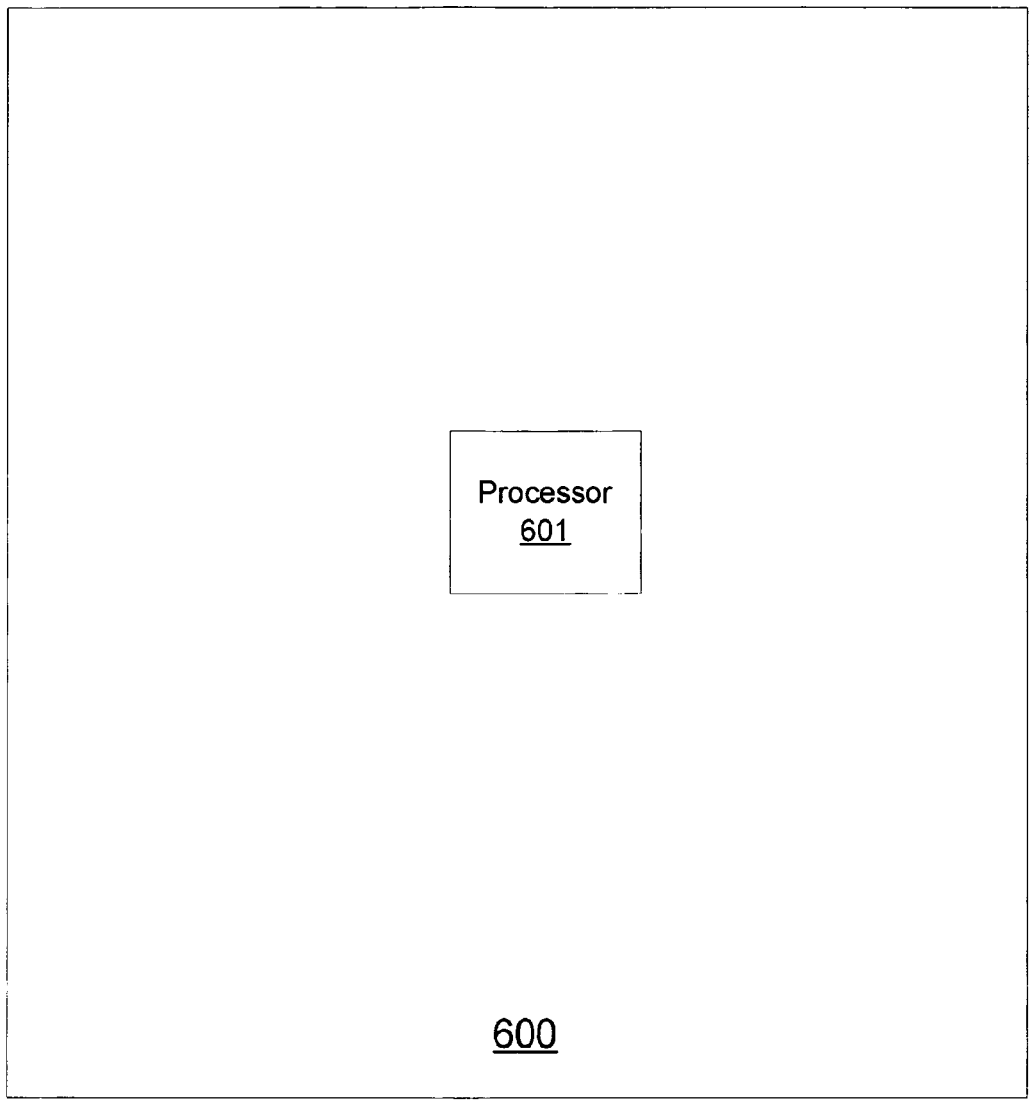
FIG. 21 illustrates a block diagram of an alternative embodiment of the Location Processor Node.

FIG. 20 illustrates a block diagram of the BT Node that is utilized for this embodiment of the present invention. In FIG. 20, the BT Node 200, 201 obtains precise location information about itself via information that is provisioned into the BT Node.

Also in FIG. 10 and FIG. 20, the BT Node Slave(s) 201 obtains precise timing information from its BT Node Master 200, and locks its timing to that of the BT Node Master 200, and provides the timing information to the Processor 207. Each BT Node Slave 201 uses the transmission of the BT Node Master, combined with its own location to determine its synchronization with the BT Node Master 200. As depicted in FIG. 20, the Processor 207 uses the timing information and the BT Node's location information to build and maintain the timing and contents of the BT Node's transmission 220.

Figure 11:
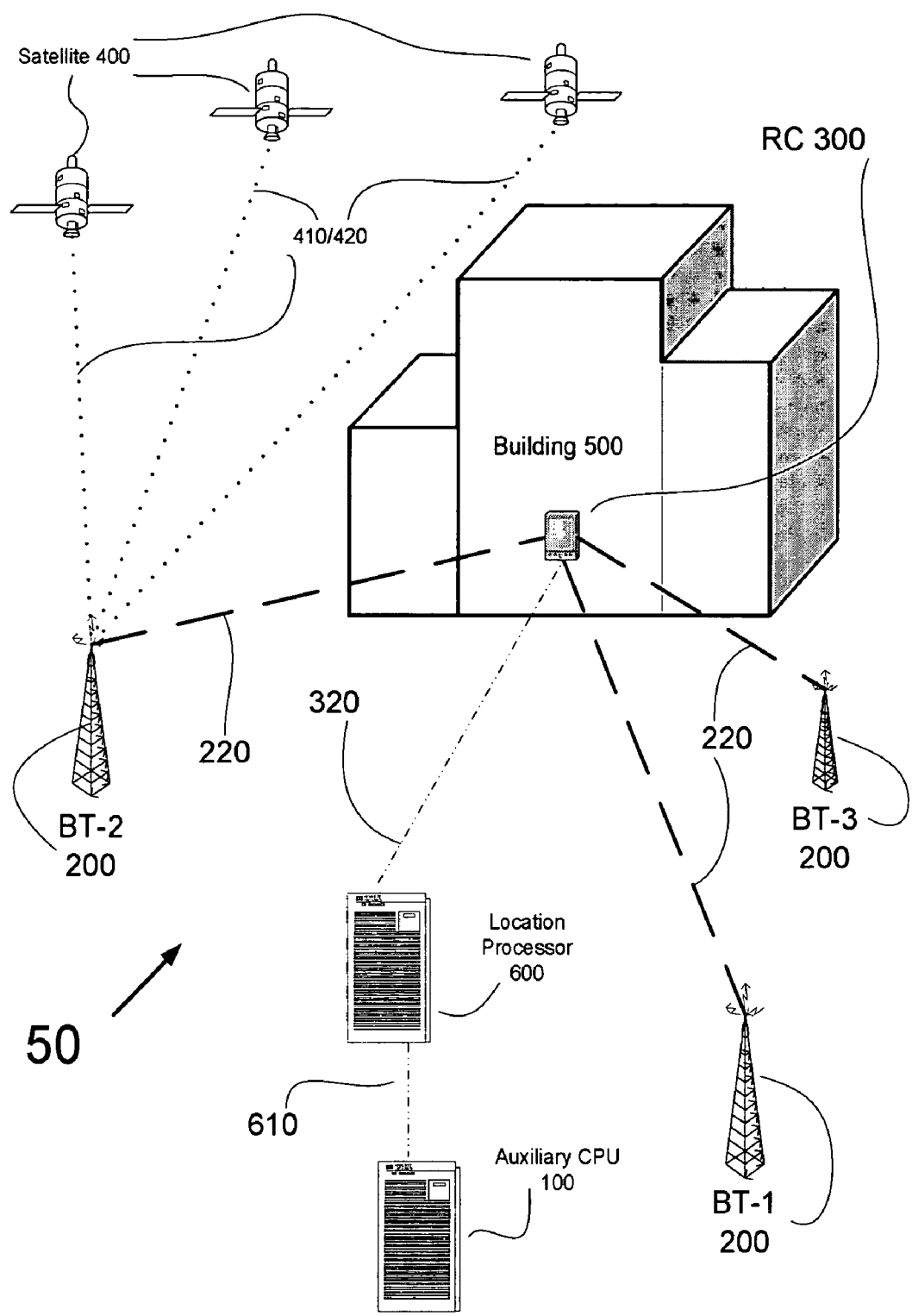
FIG. 11 illustrates a system 50, which is another embodiment of the invention.

In still another embodiment of the present invention, FIG. 11 illustrates a system 50 that utilizes some form of FM (Frequency Modulation) transmission 220 from BT Nodes 200 (illustrated further in FIG. 17), having their transmissions 220 locked (that is, synchronized) to a common time clock, such as a GPS time clock or some other arbitrary time clock 410 and contains information describing the location of each BT Node 200. An RC node 300 in Building 500 detects and receives the FM transmissions 220 from 3 or more BT Nodes 200. The BT Node transmissions 220 contain information that describes the location of the BT Node, the location being derived from a high-precision location determination device (such as Differential-GPS) 420 and 209)

Utilizing a common locked time amongst the transmitted signals 220, the RC node 300 determines the Time Difference of Arrival (TDOA) of the received signals and combines this information with the location information of each BT Node 200, and thereafter transmits 320 the TDOA and location information to the Location Processor 600. The Location Processor 600 will determine the location of the RC Node 300 by formulating and solving simultaneous hyperbolic equations. After the location of the RC Node 300 is determined, the Location Processor 600 may transmit the location information (610) to an Auxiliary CPU 100 for subsequent application processing, or perform subsequent application processing on its own CPU 600.

FIG. 17 illustrates a block diagram of the BT Node that is utilized for this embodiment of the present invention. In this illustration, the BT Node 200 obtains precise location information about itself via a Precision Location-Determination Device 209 (such as a Differential-GPS or some other high-precision location system) and provides this location information to the Processor 207. Also in FIG. 17, the BT Node 200—specifically a High-Precision Timing Source 208 device—obtains precise timing information from some form of external high-precision timing source (such as GPS time, or some other arbitrary external time source) and provides the timing information to the Processor 207. As depicted in FIG. 17, the BT Node Processor 207 uses the timing information and the BT Node's location information to build and maintain the timing and contents of the BT Node's transmission 220.

The capability to generate an accurate 3-D location fix depends, in part, on the angular geometry of the BT Nodes 200 in relation to the location of the "object" RC Node 300 (that is, the RC node to be located). In this embodiment, the High-Precision Location Device 209 embedded in each BT Node allows the BT Node(s) 200 to be portable, because the High-Precision Location Device 209 continually updates the current location of its BT Node 200. This means that one or more BT Nodes 200 may be transported to locations that enhance angular-geometry, resulting in more precise location fixes to the object RC Node 300.

Figure 12:
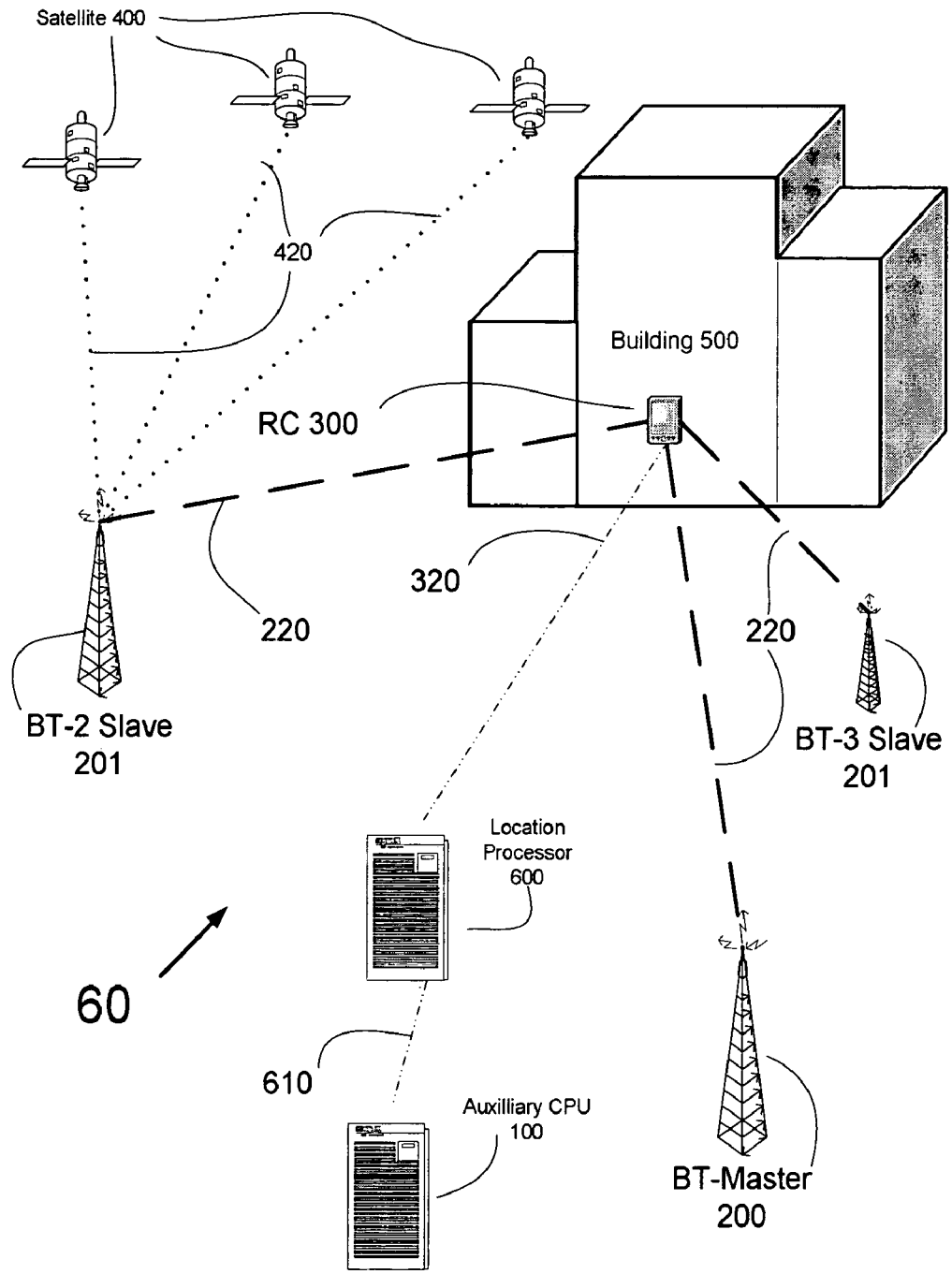
FIG. 12 illustrates a system 60, which is another embodiment of the invention.

In still another embodiment of the present invention, FIG. 12 illustrates a system 60 that utilizes some form of FM (Frequency Modulation) transmission 220 from BT Nodes 200, 201 (illustrated further in FIG. 18), having their transmissions 220 locked (that is, synchronized) to a common time clock, such as a GPS time clock or some other arbitrary time clock and contains information describing the location of each BT Node 200, 201. An RC node 300 in Building 500 detects and receives the FM transmissions 220 from 3 or more BT Nodes 200, 201. The BT Node transmissions 220 contain information that describes the location of the BT Node, the location being derived from a high-precision location determination device (such as Differential-GPS) 420 and 209)

Utilizing a common locked time amongst the transmitted signals 220, the RC node 300 determines the Time Difference of Arrival (TDOA) of the received signals and combines this information with the location information of each BT Node 200, 201, and thereafter transmits 320 the TDOA and location information to the Location Processor 600. The Location Processor 600 will determine the location of the RC Node 300 by formulating and solving simultaneous hyperbolic equations. After the location of the RC Node 300 is determined, the Location Processor 600 may transmit the location information (610) to an Auxiliary CPU 100 for subsequent application processing, or perform subsequent application processing on its own CPU 600.

FIG. 18 illustrates a block diagram of the BT Node that is utilized for this embodiment of the present invention. In this illustration, the BT Node 200, 201 obtains precise location information about itself via a Precision Location-Determination Device 209 (such as a Differential-GPS or some other high-precision location system) and provides this location information to the Processor 207.

Also in FIG. 12 and FIG. 18, the BT Node Slave(s) 201 obtains precise timing information from its BT Node Master 200, and locks its timing to that of the BT Node Master 200, and provides the timing information to the Processor 207. The BT Node Slave 201 uses the transmission of the BT Node Master, combined with its own location to determine its synchronization with the BT Node Master 200. As depicted in FIG. 18, the BT Node's Processor 207 uses the timing information and the BT Node's location information to build and maintain the timing and contents of the BT Node's transmission 220.

The capability to generate an accurate 3-D location fix depends, in part, on the angular geometry of the BT Nodes 200, 201 in relation to the location of the "object" RC Node 300 (that is, the RC node to be located). In this embodiment, the High-Precision Location Device 209 embedded in each BT Node allows the BT Node(s) 200 to be portable, because the High-Precision Location Device 209 continually updates the current location of its BT Node 200, 201. This means that one or more BT Nodes 200 may be transported to locations that enhance angular geometry, resulting in more precise location fixes to the object RC Node 300.

Figure 13:
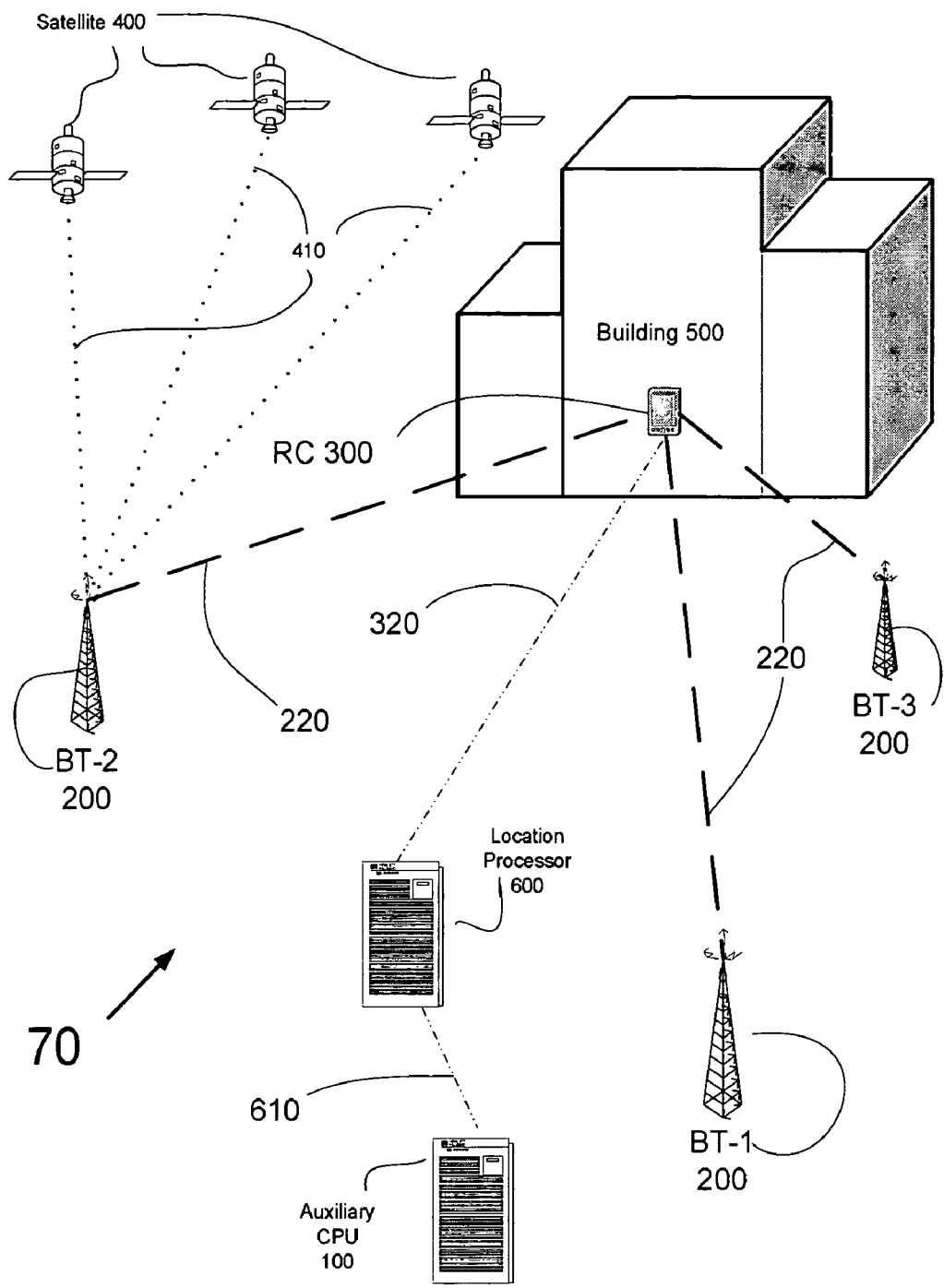
FIG. 13 illustrates a system 70, which is another embodiment of the invention.

In still another embodiment of the present invention, FIG. 13 illustrates a system 70 that utilizes some form of FM (Frequency Modulation) transmission 220 from BT Nodes 200 (illustrated further in FIG. 19), having their transmissions 220 locked (that is, synchronized) to a common time clock, such as a GPS time clock or some other arbitrary time clock 410 and contains information describing the location of each BT Node 200. An RC node 300 in Building 500 detects and receives the FM transmissions 220 from 3 or more BT Nodes 200. The BT Node transmissions 220 contain information that describes the location of the BT Node, which is previously provisioned into the BT Node 200.

Utilizing a common locked time amongst the transmitted signals 220, the RC node 300 determines the Time Difference of Arrival (TDOA) of the received signals and combines this information with the location information of each BT Node 200, and thereafter transmits 320 the TDOA and location information to the Location Processor 600. The Location Processor 600 will determine the location of the RC Node 300 by formulating and solving simultaneous hyperbolic equations. After the location of the RC Node 300 is determined, the Location Processor 600 may transmit the location information (610) to an Auxiliary CPU 100 for subsequent application processing, or perform subsequent application processing on its own CPU 600.

FIG. 19 illustrates a block diagram of the BT Node that is utilized for this embodiment of the present invention. In FIG. 19, the BT Node 200 obtains precise location information about itself as a result of previous provisioning of the BT Node 200. Also in FIG. 19, the BT Node 200—specifically a High-Precision Timing Source 208 device—obtains precise timing information from some form of external high-precision timing source (such as GPS time, or some other arbitrary external time source) and provides the timing information to the Processor 207. As depicted in FIG. 19, the Processor 207 uses the timing information and the BT Node's location information to build and maintain the timing and contents of the BT Node's transmission 220.

Figure 14:
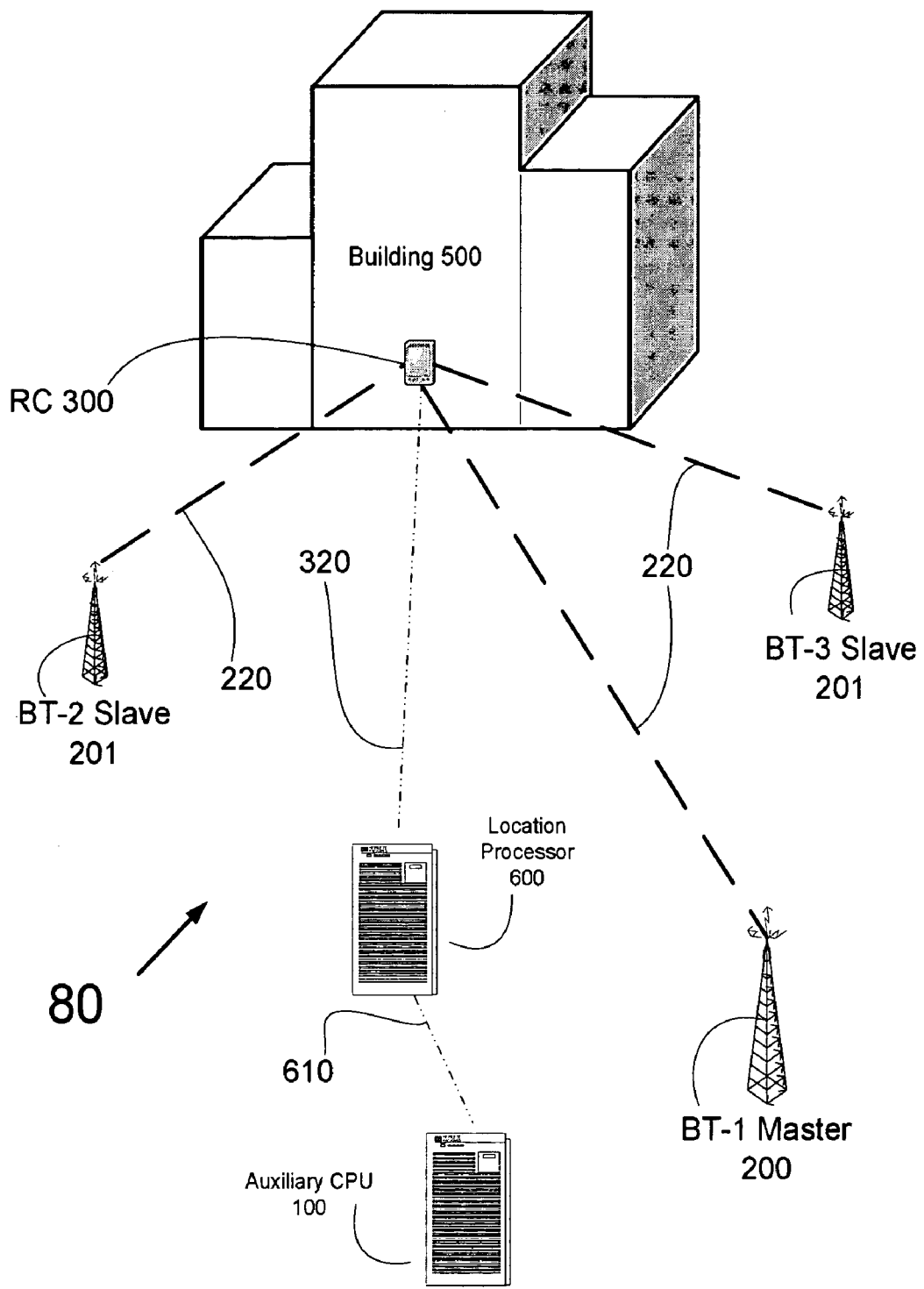
FIG. 14 illustrates a system 80, which is another embodiment of the invention.

In still another embodiment of the present invention, FIG. 14 illustrates a system 80 that utilizes some form of FM (Frequency Modulation) transmission 220 from BT Nodes 200, 201 (illustrated further in FIG. 20), having their transmissions 220 locked (that is, synchronized) to a common time clock, such as some arbitrary time clock and contains information describing the location of each BT Node 200, 201. An RC node 300 in Building 500 detects and receives the FM transmissions 220 from 3 or more BT Nodes 200. The BT Node transmissions 220 contain information that describes the location of the BT Node, which is previously provisioned into the BT Node 200.

Utilizing a common locked time amongst the transmitted signals 220, the RC node 300 determines the Time Difference of Arrival (TDOA) of the received signals and combines this information with the location information of each BT Node 200, 201, and thereafter transmits 320 the TDOA and location information to the Location Processor 600. The Location Processor 600 will determine the location of the RC Node 300 by formulating and solving simultaneous hyperbolic equations. After the location of the RC Node 300 is determined, the Location Processor 600 may transmit the location information (610) to an Auxiliary CPU 100 for subsequent application processing, or perform subsequent application processing on its own CPU 600.

FIG. 20 illustrates a block diagram of the BT Node that is utilized for this embodiment of the present invention. In FIG. 20, the BT Node 200, 201 obtains precise location information about itself via information that is previously provisioned into the BT Node 200, 201.

Also in FIG. 14 and FIG. 20, each BT Node Slave 201 obtains precise timing information from its BT Node Master 200, and locks its timing to that of the BT Node Master 200, and provides the timing information to the Processor 207. Each BT Node Slave 201 uses the transmission of the BT Node Master, combined with its own location to determine its synchronization with the BT Node Master 200. As depicted in FIG. 20, the Processor 207 uses the timing information and the BT Node's location information to build and maintain the timing and contents of the BT Node's transmission 220.

Figure 15:
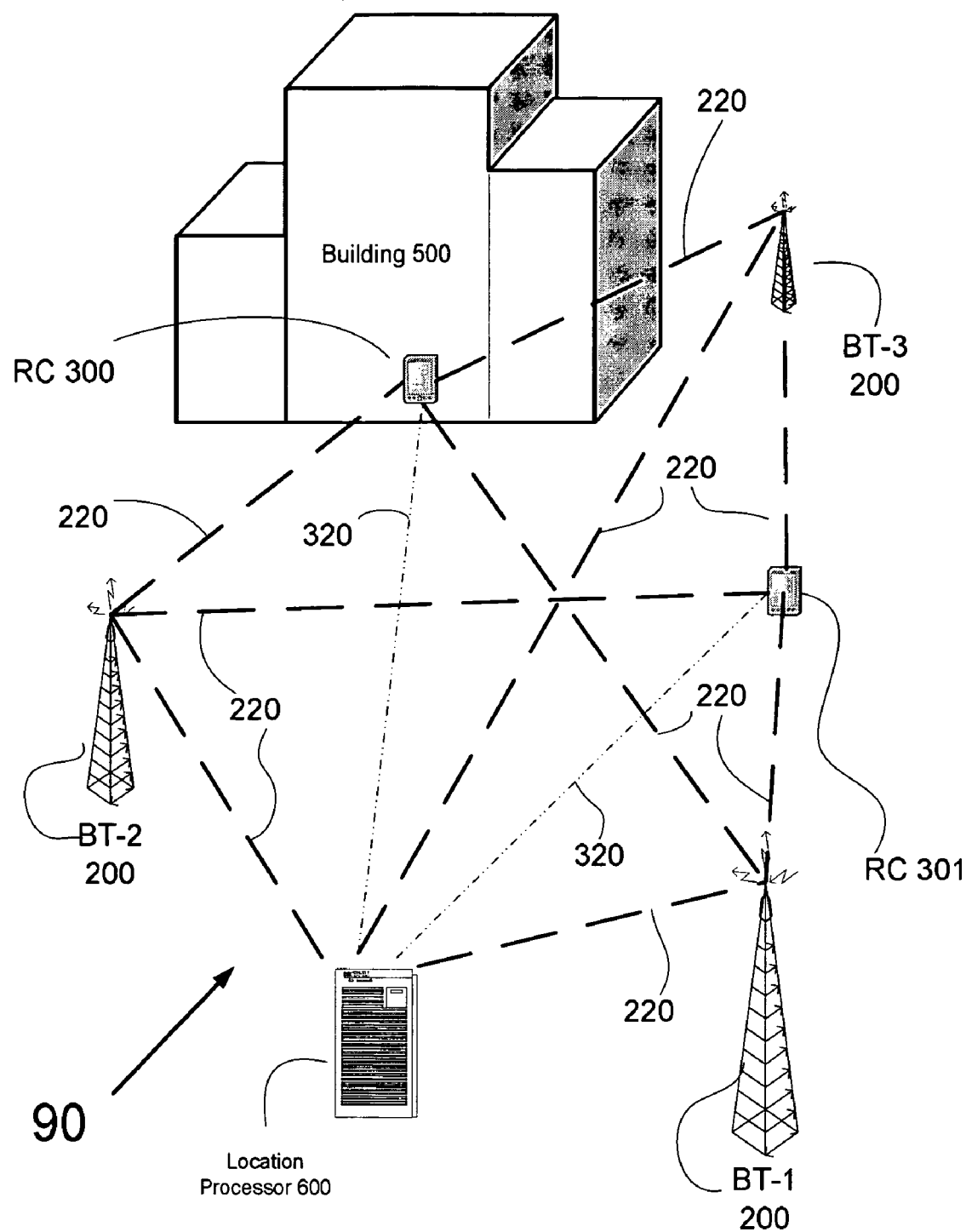
FIG. 15 illustrates a system 90, which is another embodiment of the invention.

In still another embodiment of the present invention, FIG. 15 illustrates a system 90 that utilizes some form of FM (Frequency Modulation) transmission 220 from BT Nodes 200 (illustrated further in FIG. 17), having their transmissions 220 not locked (that is, not synchronized) to any common time clock, having the time interval between each pulse the same amongst all of the BT Nodes 200, and contains information describing the location of each BT Node 200. One or more RC nodes 300, 301 each detects and receives the FM transmissions 220 from the same 3 or more BT Nodes 200. The BT Node transmissions 220 contain information that describes the location of the BT Node 200, the location being derived from a high-precision location determination device (such as Differential-GPS) 209 or from information previously provisioned into each BT Node 200.

Figure 22:
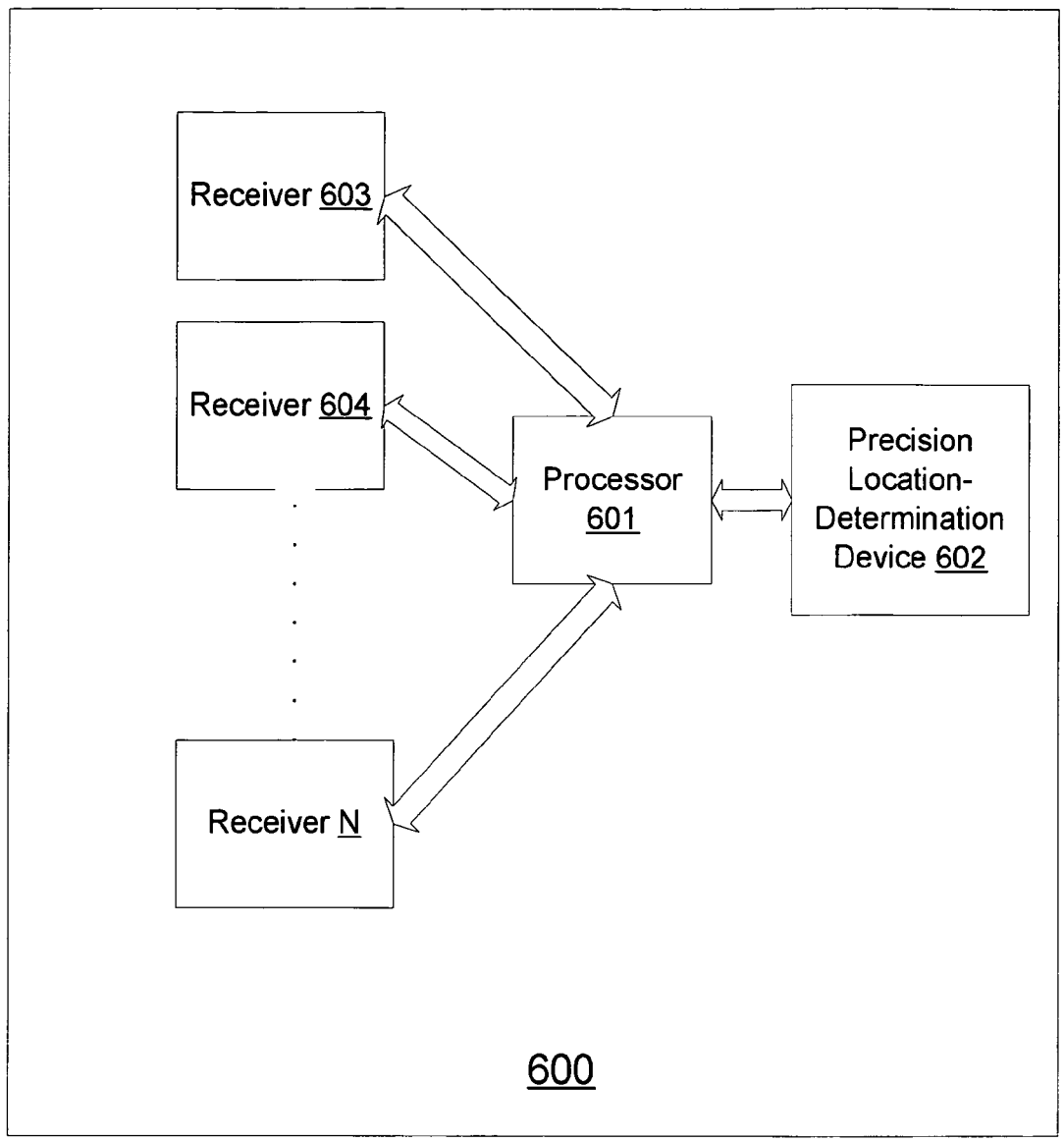
FIG. 22 illustrates a block diagram of an alternative embodiment of the Location Processor Node.
Figure 25A:
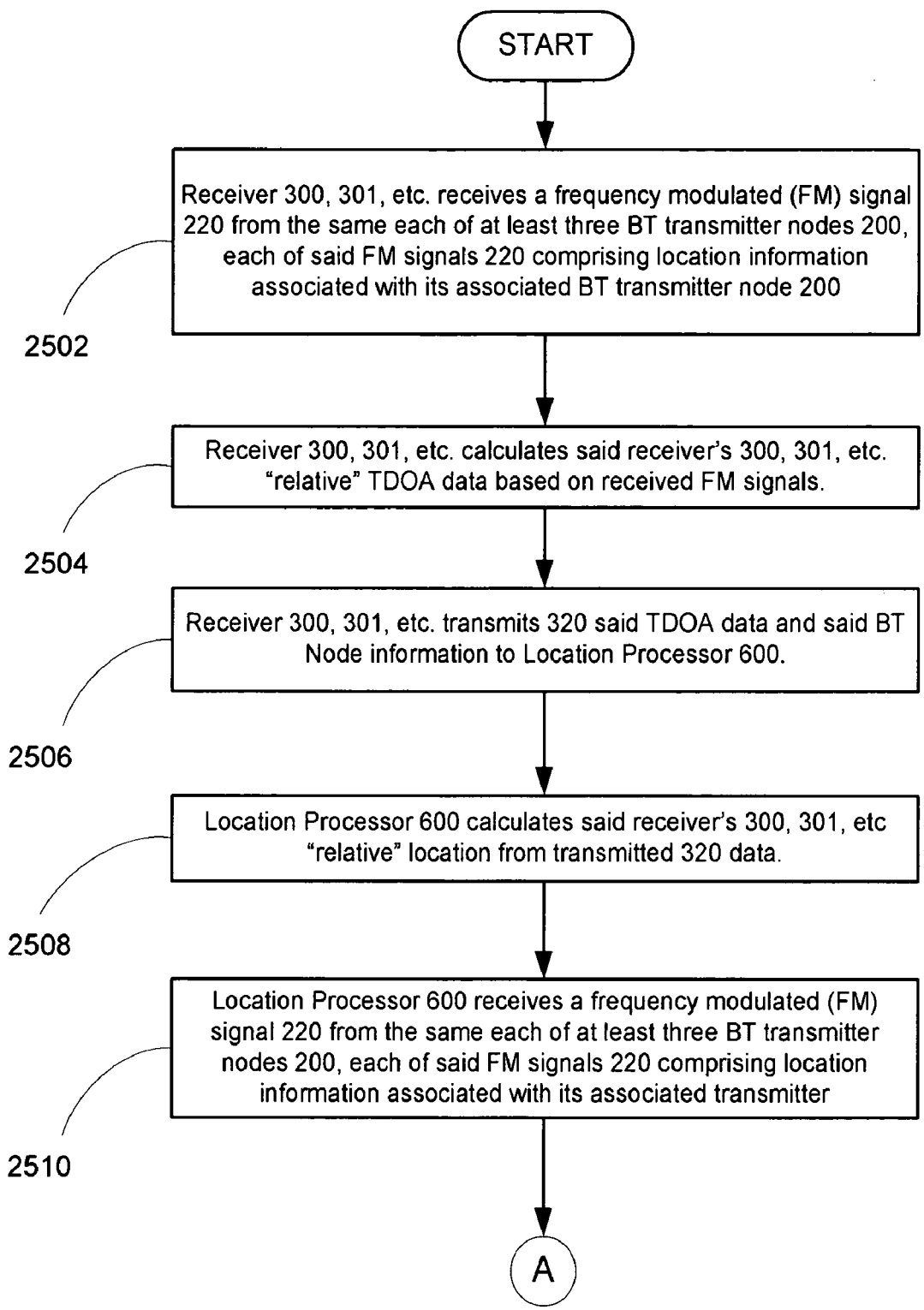
FIGS. 25A-B are a flow chart of a method for relative position location according to an embodiment of the present invention.
Figure 25B:
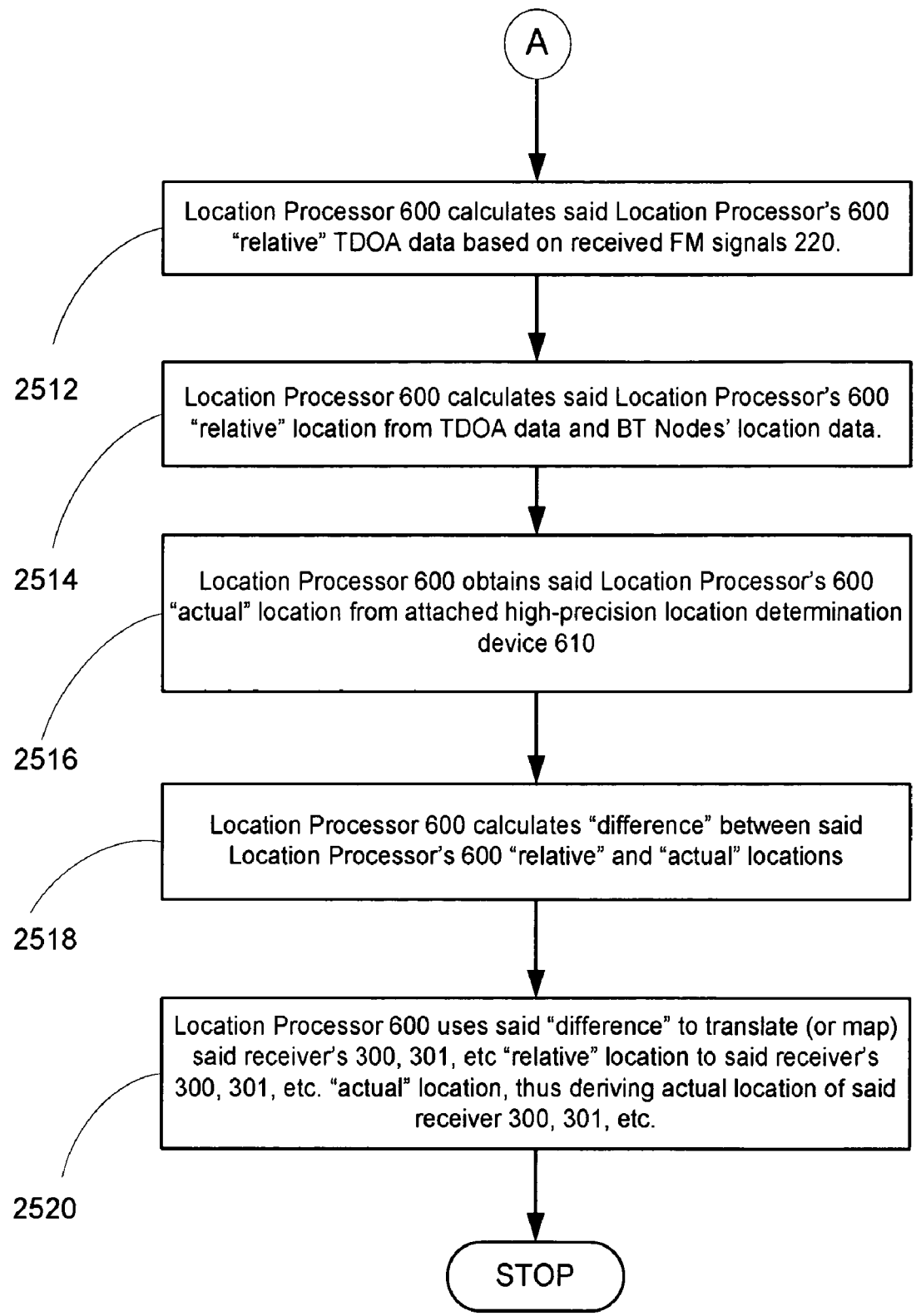

FIG. 25 is a flow chart of a method embodiment for relative position location determination according to the present invention. The method includes the following: processing as though a common locked time exists amongst the transmitted signals 220, each RC node 300, 301, etc. determines the Time Difference of Arrival (TDOA) of the received signals and combines this information with the location information of each BT Node 200, and thereafter transmits 320 the TDOA and location information to the Location Processor 600 (illustrated further in FIG. 22). Using the BT Node location information and the TDOA information, the Location Processor 600 will determine the "relative" location of each RC Node 300 by formulating and solving simultaneous hyperbolic equations. As an alternative, each RC node 300, 301, etc. may determine its own relative location, and transmit its relative location along with the location of each BT Node 200 that was used in the calculation to the Location Processor 600.

After the relative location of each RC Node 300, 301, etc. is determined, the Location Processor will determine its own relative location in the following manner: Processing as though a common locked time exists amongst the transmitted signals 220 from the same three or more BT nodes, the Location Processor 600 determines the TDOA of the received signals and combines this information with the location information of each BT Node 200. Then, by formulating and solving simultaneous hyperbolic equations, the Location Processor 600 may determine the relative location of the Location Processor 600, itself.

After the relative location of the Location Processor 600 has been determined, the Location Processor 600 will access the attached high-precision location device (610), determine the "difference" between its own relative location and actual location, and use this measured "difference" to map the relative RC Node 300, 301, etc. locations to corresponding actual locations. Upon completion of these location calculations, the Location Processor 600 may transmit the location information 610 to an Auxiliary CPU 100 for subsequent application processing, or perform subsequent application processing on its own CPU 600.

Figure 16:
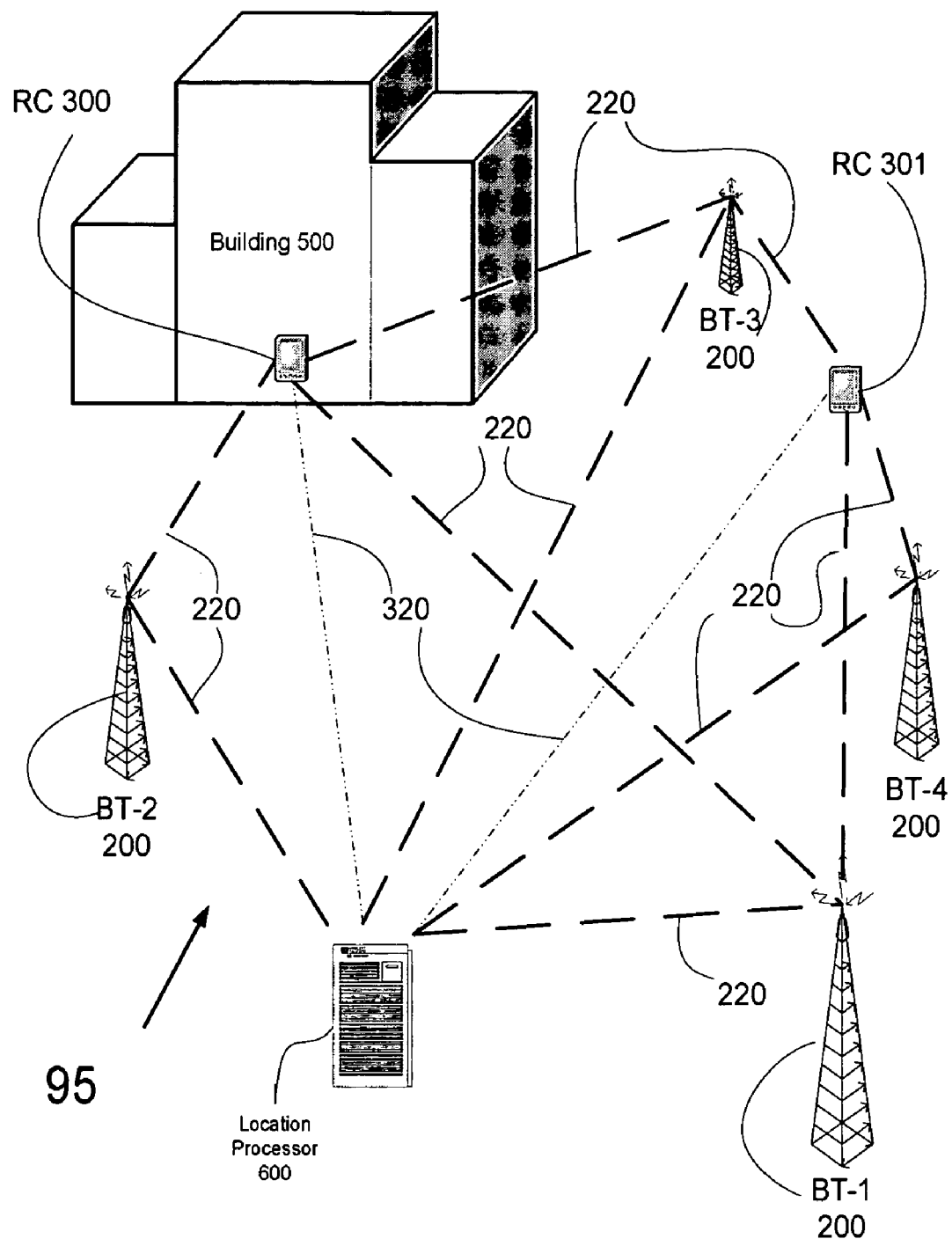
FIG. 16 illustrates a system 95, which is another embodiment of the invention.

In still another embodiment of the present invention, FIG. 16 illustrates a system 95 that utilizes some form of FM (Frequency Modulation) transmission 220 from BT Nodes 200 (illustrated further in FIG. 17), having their transmissions 220 not locked (that is, not synchronized) to any arbitrary common time clock, having the same time interval between each pulse amongst all of the BT Nodes 200, and contains information describing the location of each BT Node 200. Each RC node 300, 301, etc. detects and receives the FM transmissions 220 from three or more (not necessarily the same) BT Nodes 200. The BT Node transmissions 220 contain information that describes the location of the BT Node, the location being derived from a high-precision location determination device (such as Differential-GPS) 209 or from information previously provisioned into each BT Node 200.

Figure 26A:
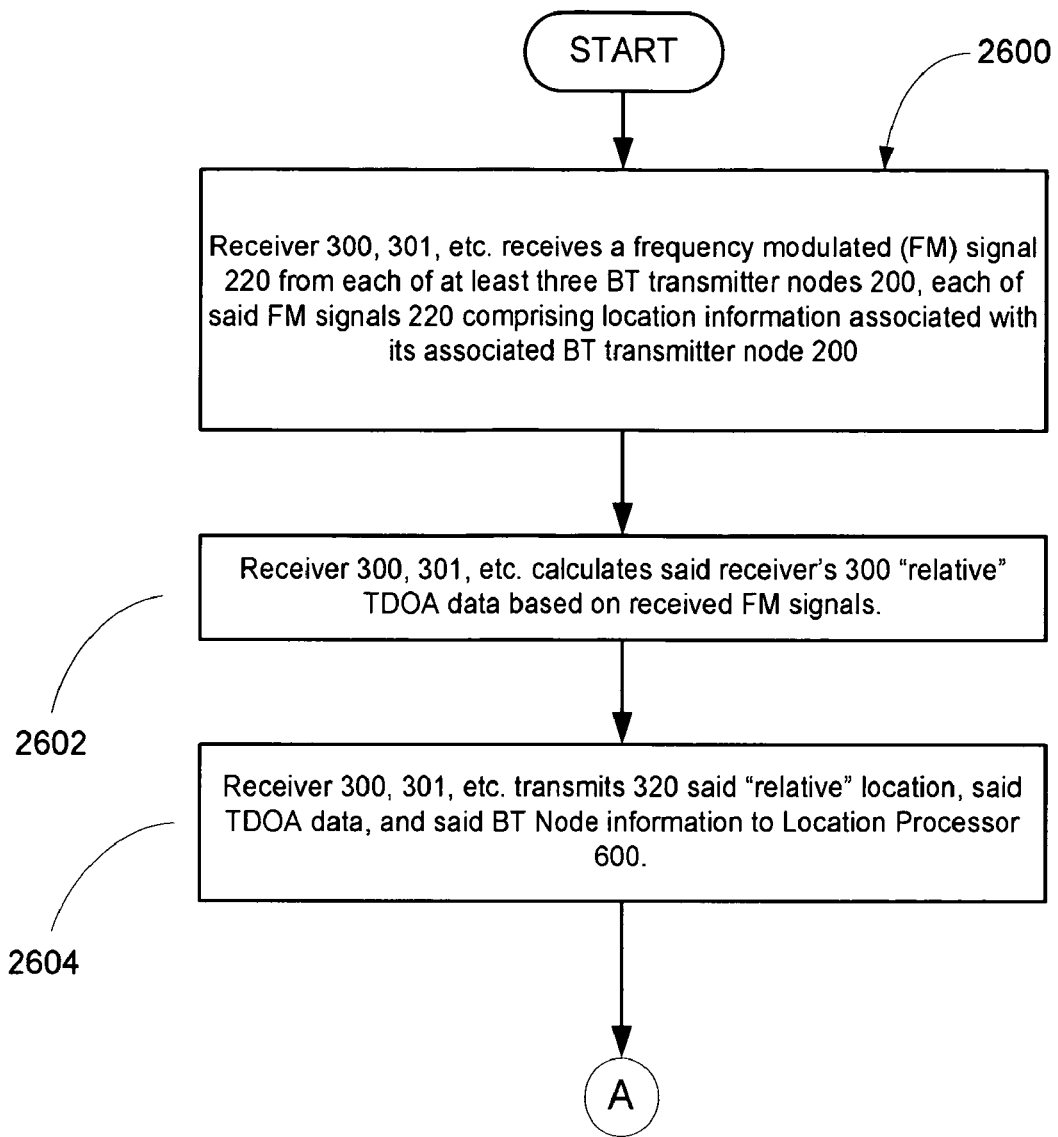
FIGS. 26 A-B are a flow chart of another method for relative position location according to an embodiment of the present invention.
Figure 26B:
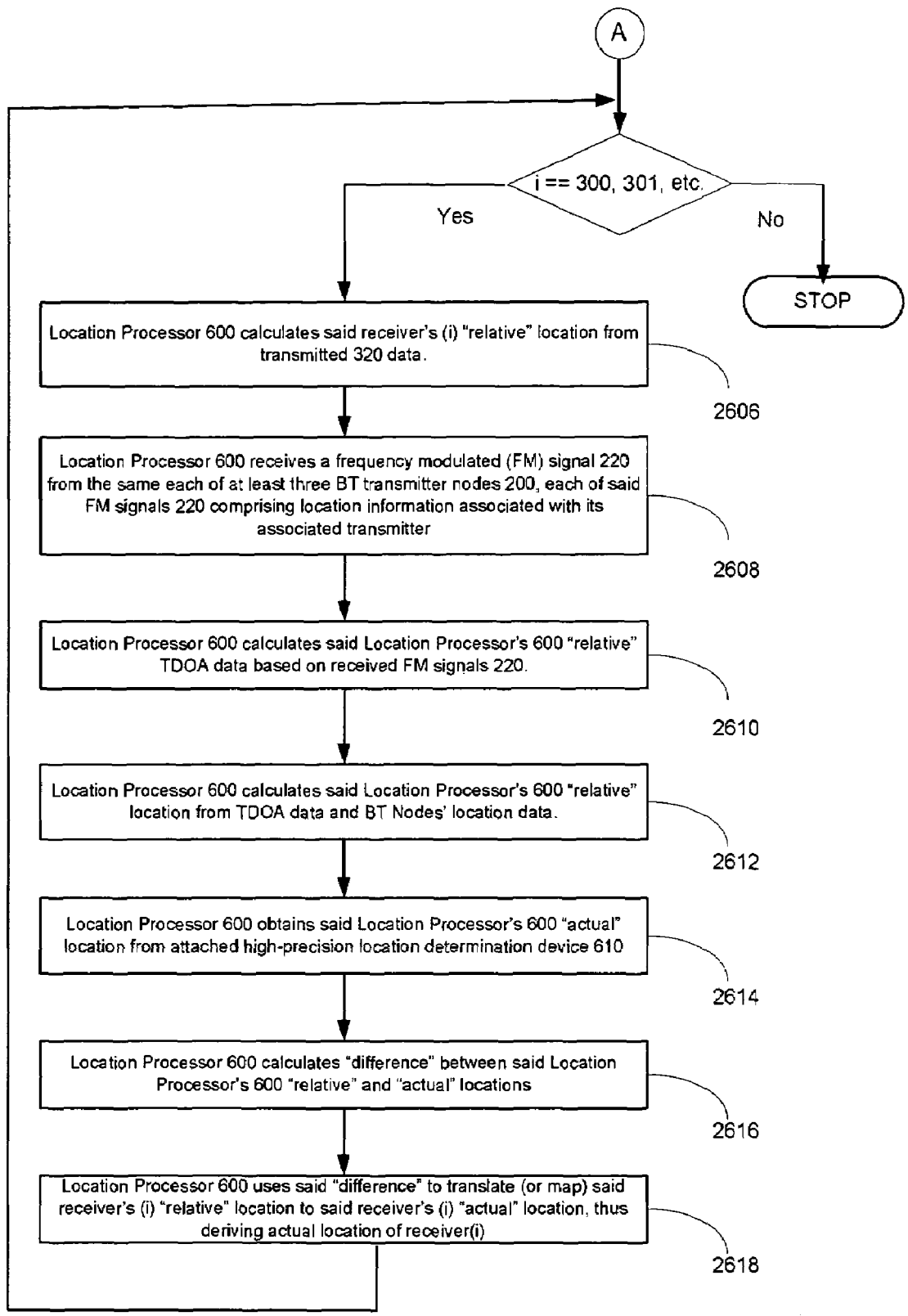

FIG. 26 is a flow chart of another method embodiment of the present invention for relative location determination. The method includes the following: processing as though a common locked time exists amongst the transmitted signals 220, each RC node 300 determines the Time Difference of Arrival (TDOA) of the received signals and combines this information with the location information of each corresponding BT Node 200, and thereafter transmits 320 the TDOA and BT Node location information to the Location Processor 600. Using the BT Node location information and the TDOA information, the Location Processor 600 will separately determine the "relative" location of each RC Node 300 by formulating and solving simultaneous hyperbolic equations for each RC Node 300.

In an alternative embodiment, each RC node may determine its own relative location, by formulating and solving simultaneous hyperbolic equations. Once the RC Node 300, 301, etc. relative location is determined, the RC Node 300, 301, etc. transmits its relative location with corresponding BT Node location information to the Location Processor 600.

After the relative location of each RC Node 300, 301, etc is determined, the Location Processor 600 will determine the actual location of each RC Node, in turn, in the following manner: The Location Processor 600 determines its own relative location by using the same BT Node 200 transmissions that were used by the target RC Node 300, 301, etc): Processing as though a common locked time exists amongst the transmitted signals 220, the Location Processor determines the TDOA of the received signals and combines this information with the location information of each BT Node 200. Then, by formulating and solving simultaneous hyperbolic equations, the Location Processor 600 will determine the relative location of the Location Processor 600, itself.

After the relative location of the Location Processor 600 has been determined, the Location Processor 600 will access the attached high-precision location device 610 and obtain the Location Processor's 600 actual location, determine the "difference" between its own relative location and actual location, and use this measured difference to map the relative RC Node 300, 301, etc. location to the RC node's 300, 301, etc. corresponding actual location. Upon completion of these location calculations, the Location Processor 600 may transmit the location information 610 to an Auxiliary CPU 100 for subsequent application processing, or perform subsequent application processing on its own CPU 600.

Figure 23:
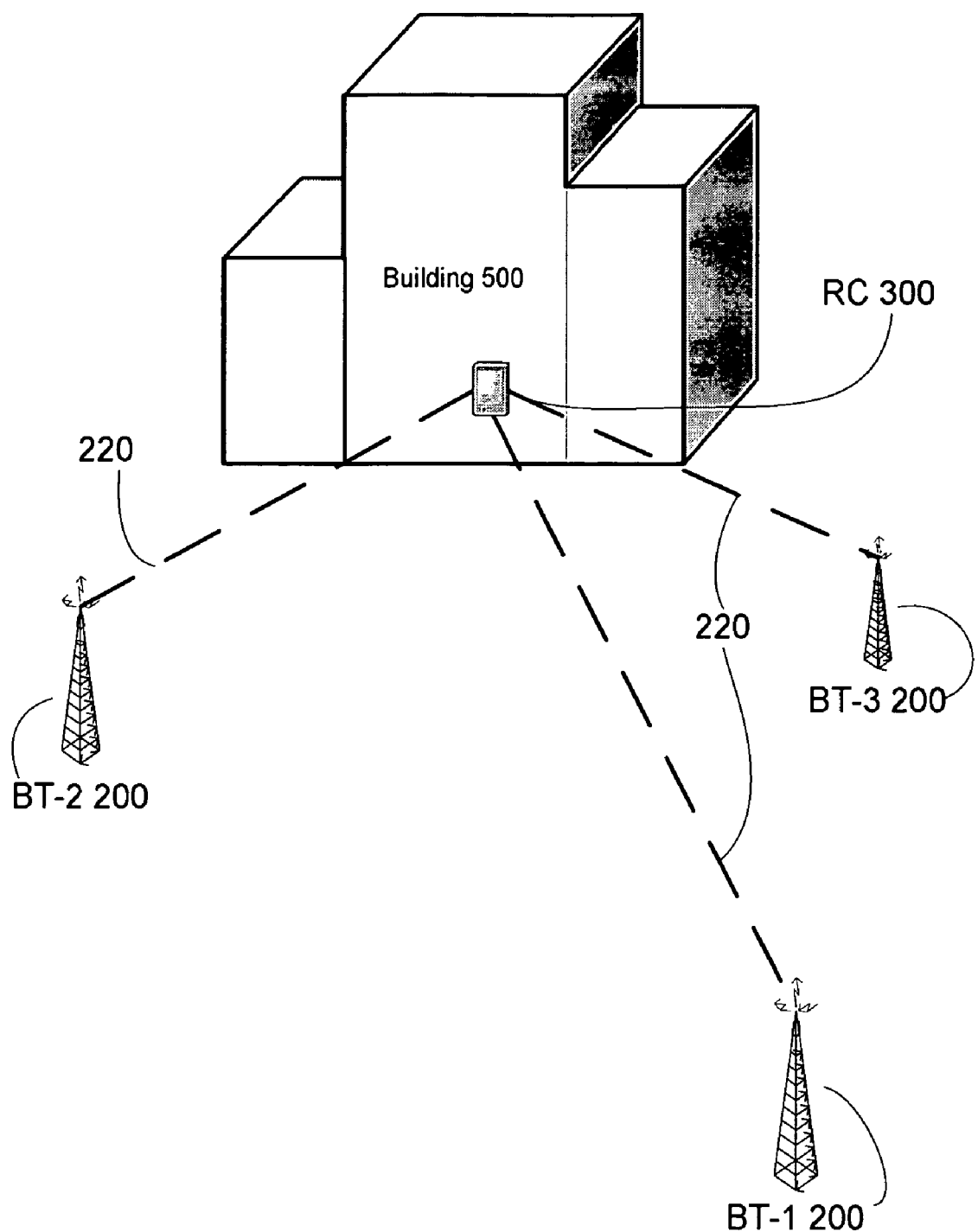
FIG. 23 is a block diagram illustrating an embodiment of a method according to the present invention.

FIG. 23 illustrates a diagram for an embodiment of a method for locating an object. This embodiment of the method utilizes some form of FM (Frequency Modulation) transmission 220 from 3 or more BT Nodes 200, having their transmissions 220 locked (that is, synchronized) to a common time clock, such as a GPS time clock or some other arbitrary time clock and contains information describing the location of each BT Node 200. An RC node 300 in Building 500 detects and receives the FM transmissions 220 from 3 or more BT Nodes 200. Utilizing a common locked time amongst the transmitted signals 220, the RC node 300 determines the Time Difference of Arrival (TDOA) of the received signals and combines this information with the location information of each BT Node 200, and thereafter calculates its location.

Figure 24:
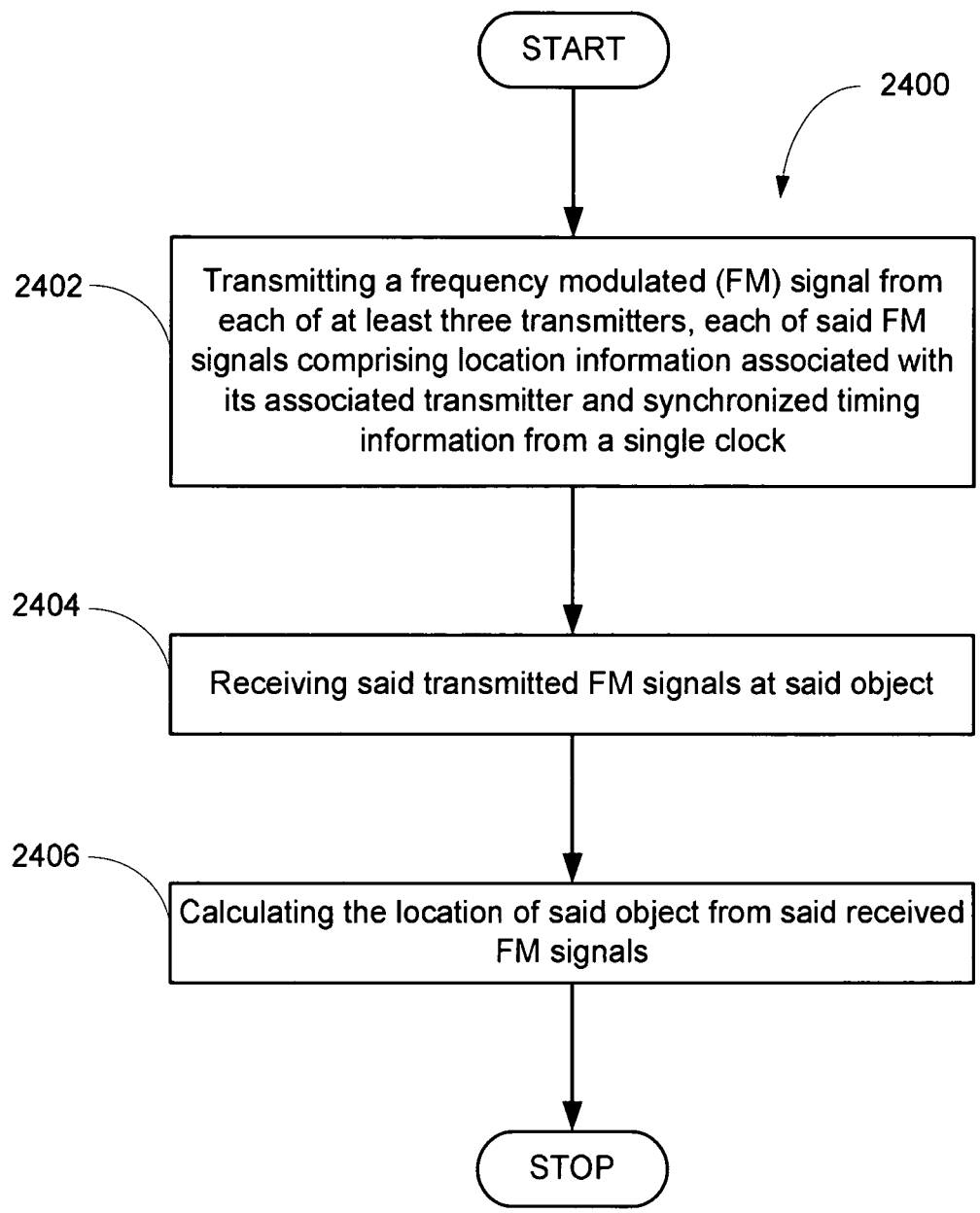
FIG. 24 is a flow chart of an embodiment of a method for locating an object according to the present invention.

FIG. 24 is a flow chart of an embodiment of a method (2400) for locating an object according to the present invention. Method (2400) may include transmitting (2402) a frequency modulated (FM) signal from each of at least three transmitters, each of the FM signals comprising location information associated with its associated transmitter and synchronized timing information from a single clock. Method (2400) may further include receiving (2404) the transmitted FM signals at the object and calculating (2406) the location of the object from the received FM signals.

According to another embodiment of method 2400, the location information may include global positioning satellite (GPS) location information. According to yet another embodiment of method 2400, the timing information may be global positioning satellite (GPS) clock timing information. According to still another embodiment of method 2400, each of the FM signals further include a unique identifier associated with its associated transmitter. According to still other embodiments of method 2400, calculating 2406 may include calculating a time difference of arrival (TDOA) for each of the received FM signals, formulating a hyperbolic equation for each pair of the received FM signals to obtain a set of hyperbolic equations and solving the set of hyperbolic equations with the TDOA for each of the FM signals to determine the location of the object.

CONCLUSION

The present invention will provide highly-accurate and timely location information on a variety of electronic devices and in a variety of environments and applications. Further, the invention is specified to adapt to various environments, thus providing the necessary angular geometry to obtain highly-accurate indoor and outdoor location fixes.

Specific embodiments have been shown by way of example in the drawings and have been described in detail herein, however the invention may be susceptible to additional various modifications and alternative forms and embodiments. It should be understood that the invention is not intended to be limited to the particular forms disclosed. Rather, the invention includes all modifications, equivalents, and alternatives falling within the spirit and scope of the invention as defined by the following appended claims.

What is claimed is:

1. A position location system, comprising:
a plurality of portable transmitters, each of said plurality of portable transmitters configured for transmitting frequency modulation (FM) signals, wherein each of said transmitted FM signals comprises location information associated with its transmitter;
a synchronizer in communication with each of said plurality of transmitters for locking said FM signal transmissions to a common clock, wherein said common clock comprises a global positioning system (GPS) time clock;
a receiver configured for receiving said FM signals emitted from each of said plurality of portable transmitters; and
a processor in communication with said receiver for calculating a location of said receiver using said location information from each of said plurality of portable transmitters and time differences detected amongst each of said transmitted FM signals.

2. The system of claim 1, wherein said receiver comprises an integral part of some other device.

3. The system of claim 1, wherein said receiver is configured to receive FM signals from at least three portable transmitters.

4. The system of claim 1, wherein each of said portable transmitters is configured for obtaining its location information from an external source.

5. The system of claim 1, wherein when each of said portable transmitters is transported from a current geographic location to a new geographic location, said new geographic location may provide a more accurate location calculation of said receiver.

6. A position location system, comprising:
a plurality of transmitters each transmitter configured for transmitting a frequency modulation (FM) signal, wherein said transmitted FM signal contains location information for said transmitter and when said FM signals are transmitted from each of said plurality of transmitters, a synchronization means is provided for locking each of said FM signal transmissions to a common time clock, wherein said common time clock comprises a global positioning system (GPS) time clock, and wherein each of said plurality of transmitters is portable;
a receiver for receiving said transmitted FM signals and measuring time differences detected amongst said transmitted FM signals;
a transmission means configured for sending said measured time differences and said location information for each of said transmitters; and
a calculator for receiving said measured time differences and said location information for each of said transmitters and configured for calculating a location of said receiver.

7. The system of claim 6, wherein said receiver comprises an integral part of some other apparatus.

8. The system of claim 6, wherein said plurality of transmitters comprises at least three transmitters.

9. The system of claim 6, wherein at least one of said plurality of transmitters is further configured for obtaining location information from an external source.

10. The system of claim 6, wherein at least one of said plurality of transmitters is configured for transportation from a current geographic location to a new geographic location, whereby said new geographic location may provide more accurate location calculation of said receiver.

11. A position location system comprising:
a plurality of transmitters each configured for transmitting a frequency modulation (FM) signal, wherein said transmitted FM signal contains location information of said transmitter and timing information, wherein said timing information comprises a global positioning system (GPS) time clock, and wherein each of said plurality of transmitters is portable;
a receiver configured for receiving each of said transmitted FM signals and measuring time differences detected amongst each of said transmitted FM signals from said timing information; and
a calculation apparatus in communication with said receiver for calculating a location of said receiver.

12. The system of claim 11, wherein said receiver is configured for attachment to an object for which its location may be determined.

13. The system of claim 11, wherein said plurality of transmitters comprises at least three transmitters.

14. The system of claim 11, wherein said timing information comprises timing synchronization from a common clock.

15. The system of claim 11, wherein said timing information and said location information are both derived from external sources.

16. The system of claim 11, wherein said plurality of transmitters are mobile.

17. A method for locating an object, comprising:
- receiving FM signals at an object, said FM signals transmitted from at least three transmitters, each of said FM signals locked to a common time clock for transmitting timing information, wherein said timing information comprises a global positioning system (GPS) time clock, and wherein each of said at least three transmitters is portable and each of said FM signals further comprising location information for its associated transmitter; and
- calculating a location of said object by using time differences detected amongst said timing information in each of said received FM signals and said location information.

18. A method for locating an object, comprising:
- transmitting a frequency modulated (FM) signal from each of at least three transmitters, each of said FM signals comprising location information associated with its associated transmitter and synchronized timing information from a single clock, wherein said single clock comprises a global positioning system (GPS) time clock, and wherein each of said at least three transmitters is portable;
- receiving said transmitted FM signals at said object; and
- calculating the location of said object from said received FM signals.

19. The method according to claim 18, wherein said location information comprises global positioning satellite (GPS) location information.

20. The method according to claim 18, wherein each of said FM signals further comprises a unique identifier associated with its associated transmitter.

21. The method according to claim 18, wherein said calculating comprises:
- calculating a time difference of arrival (TDOA) for each of said received FM signals;
- formulating a hyperbolic equation for each pair of said received FM signals to obtain a set of hyperbolic equations; and
- solving said set of hyperbolic equations with said TDOA for each of said FM signals to determine said location of said object.

22. A position location system, comprising:
- at least three transmitter nodes, each of said at least three transmitter nodes is portable and configured for transmitting a frequency modulated (FM) signal, said FM signal comprising:
  - location information associated with an associated one of the at least three transmitter nodes;
  - timing information from a single clock, wherein said single clock comprises a global positioning system (GPS) time clock; and
  - a unique identifier associated with said transmitter; and
- a receiver node configured for receiving said at least three FM signals and determining a location associated with said receiver node from said at least three FM signals.

23. The position location system according to claim 22, further comprising a processor in communication with said receiver node configured for determining said location from said at least three FM signals.

24. The position location system according to claim 23, wherein said processor is further configured to:
- calculate a time difference of arrival (TDOA) for each of said at least three received FM signals;
- formulate a hyperbolic equation for each pair of said at least three received FM signals to obtain a set of hyperbolic equations; and
- solve said set of hyperbolic equations with said TDOA for each of said at least three FM signals to determine said location of said receiver node.

* * * * *